(12) United States Patent
Wunderlich

(10) Patent No.: US 6,713,013 B2
(45) Date of Patent: Mar. 30, 2004

(54) SINGLE-ROW AND MULTI-ROW STRETCH BLOW MOLDING METHOD AND APPARATUS THEREFOR

(76) Inventor: Ernst Dieter Wunderlich, 55 Green Valley Dr., Warren, NJ (US) 07059

( * ) Notice: Subject to any disclaimer, the term of this patent is extended or adjusted under 35 U.S.C. 154(b) by 0 days.

(21) Appl. No.: 10/096,633

(22) Filed: Mar. 13, 2002

(65) Prior Publication Data

US 2003/0173718 A1 Sep. 18, 2003

(51) Int. Cl.[7] .......................... B29C 49/06; B29C 49/30
(52) U.S. Cl. ................... 264/532; 264/535; 264/537; 425/525; 425/526; 425/533; 425/534; 425/537; 425/538
(58) Field of Search ................ 264/513, 532, 264/535, 537; 425/525, 526, 533, 534, 537, 538

(56) References Cited

U.S. PATENT DOCUMENTS

| | | | | |
|---|---|---|---|---|
| 4,140,464 A | * | 2/1979 | Spurr et al. ................ | 425/533 |
| 4,310,282 A | * | 1/1982 | Spurr et al. ................ | 425/533 |
| 4,437,825 A | * | 3/1984 | Harry et al. ................ | 425/145 |
| 5,653,934 A | * | 8/1997 | Brun et al. ................. | 264/334 |
| 5,772,951 A | * | 6/1998 | Coxhead et al. ........... | 264/537 |
| 6,217,819 B1 | * | 4/2001 | Wunderlich ................ | 264/513 |

* cited by examiner

Primary Examiner—Suzanne E. McDowell
(74) Attorney, Agent, or Firm—Edward M. Fink

(57) ABSTRACT

In a single-row and expandable into a multi-row stretch blow molding method and apparatus, at least one row of tray plates in a tray unit is used to collect molded preforms ejected from the opening clamp of a preform-molding unit, transfer the preforms with or without transfer beads out of the molding area and align them with the center row distances of the downstream processing units. At least one robot having a universal gripper assembly is used to pick up either all or consecutively fractions of the preforms align them to the center distances of the blow mold cavities to place them at variable time intervals into a conditioning, stretch blow molding and oriented discharge unit, releases finished hollow articles and returns to a waiting position at the preform-molding and tray unit again at the preform mold's center distance independent of the preform-molding cycle. Simultaneously, component transfer devices may pick up external components, i.e. labels, valves or handles during the stretch blow molding phase and release the components into the blow-mold cavities while the universal gripper assembly is in the waiting position. The universal gripper assembly can alternatively also be pivoted to pick up preforms from a lateral reheat unit to supplement the molded preform supply. A modular stack-blow-mold clamp assembly is equipped with at least one row of blow mold cavities and with a plurality of pivoting spacing platens which in conjunction with helical spindles and nuts open and close the blow-mold halves and align their respective parting lines to correspond with the center-row distances of the transfer tray plates, conditioning and stretch blow means. Prior to the transfer of the molded preforms to a conditioning unit, internal components, i.e. sleeves or liners can be inserted into the neck and body portion of the preforms. Further, a secondary robot with a gripper assembly can pick up pre-treated preforms from the first set of blow molds and transfer them into one or several consecutive blow mold assemblies all to obtain heat stable hollow articles or improved hollow article barrier performance prior to discharging.

17 Claims, 24 Drawing Sheets

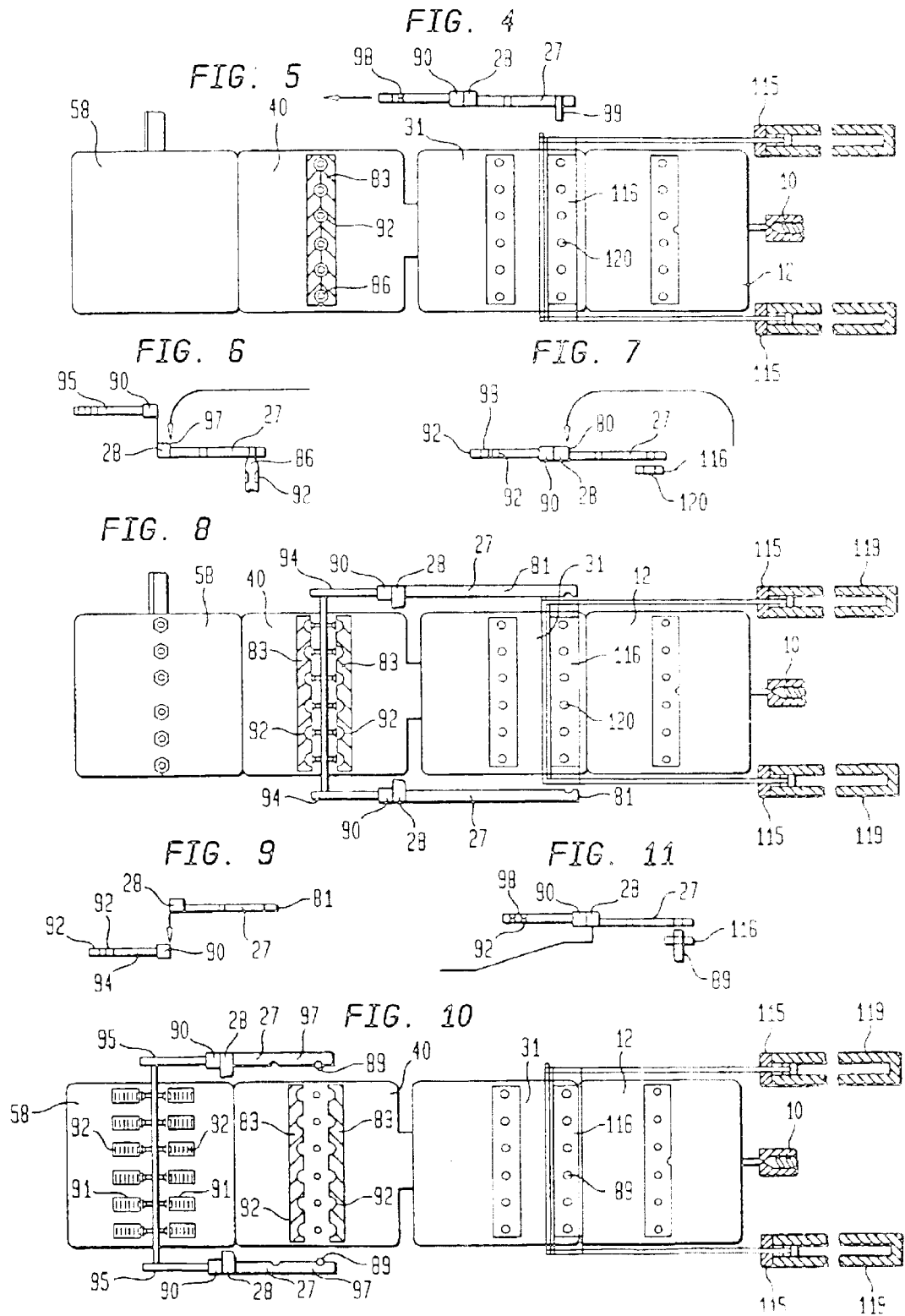

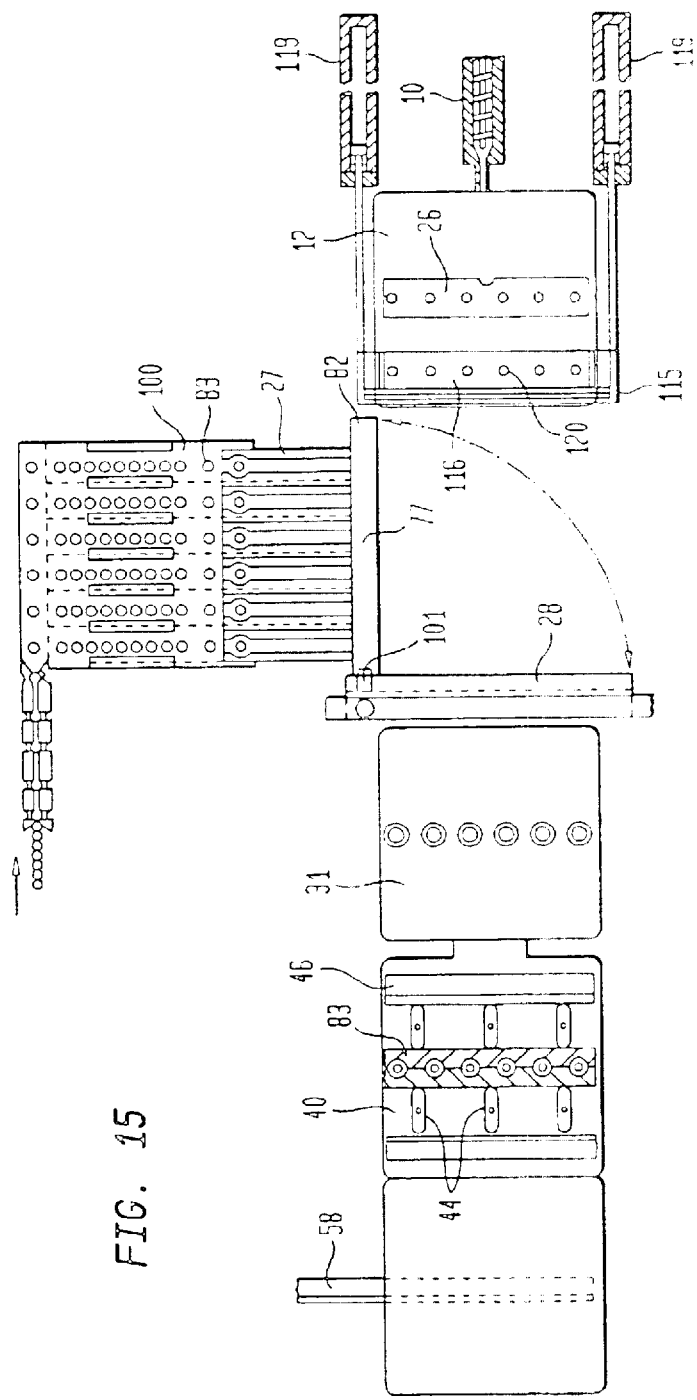
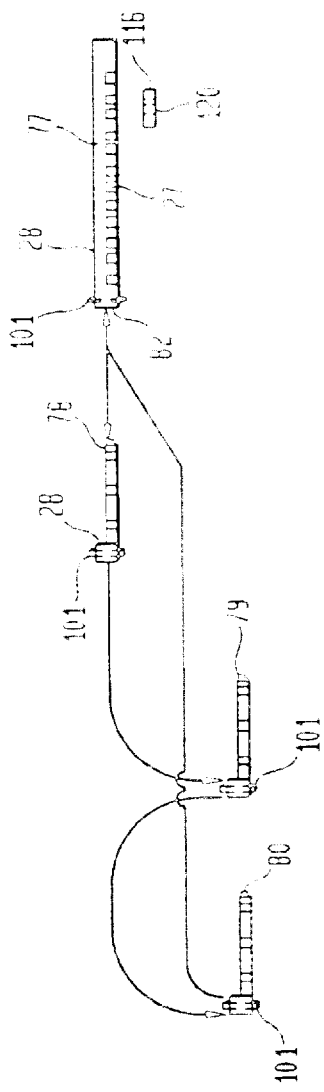
FIG. 15
FIG. 16

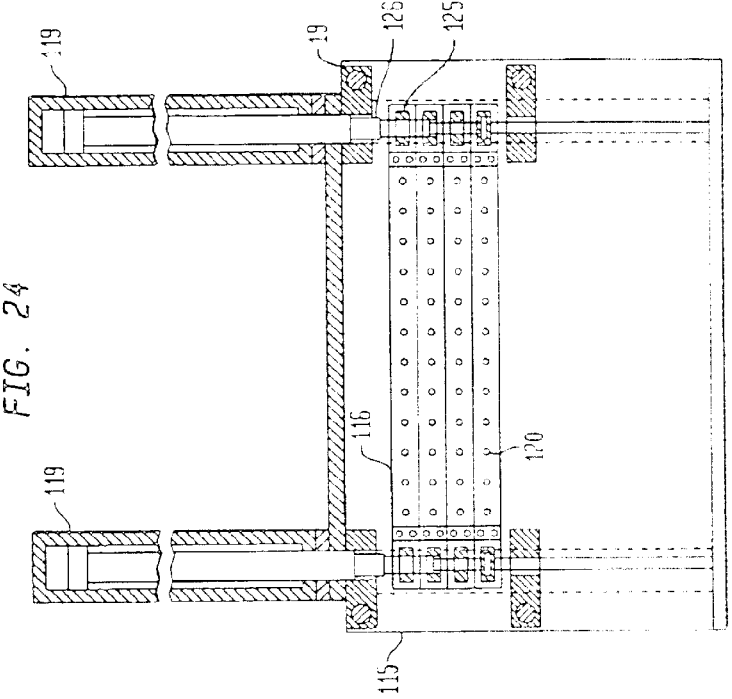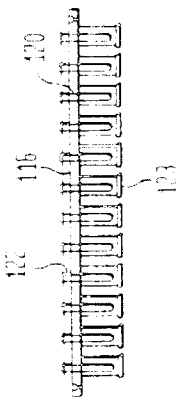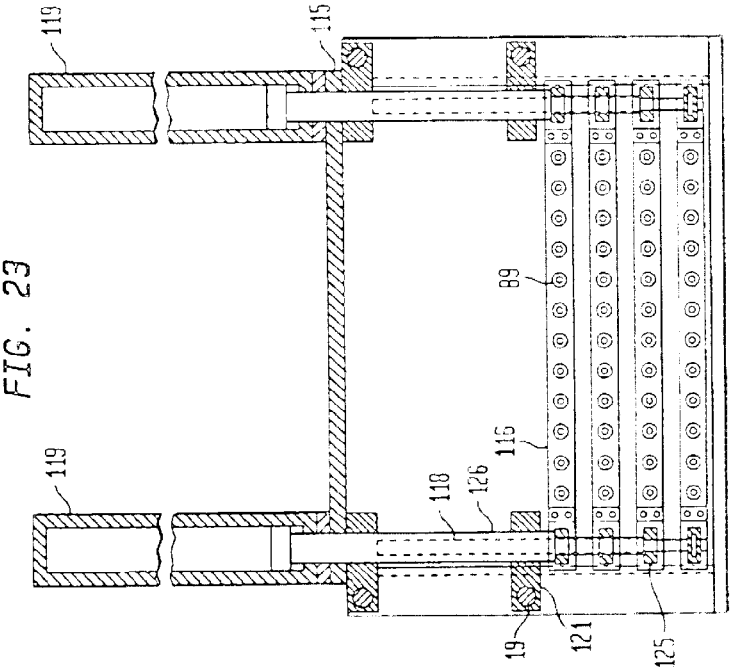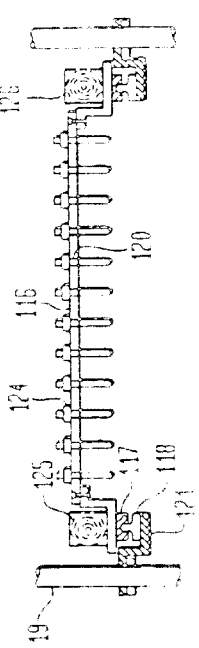

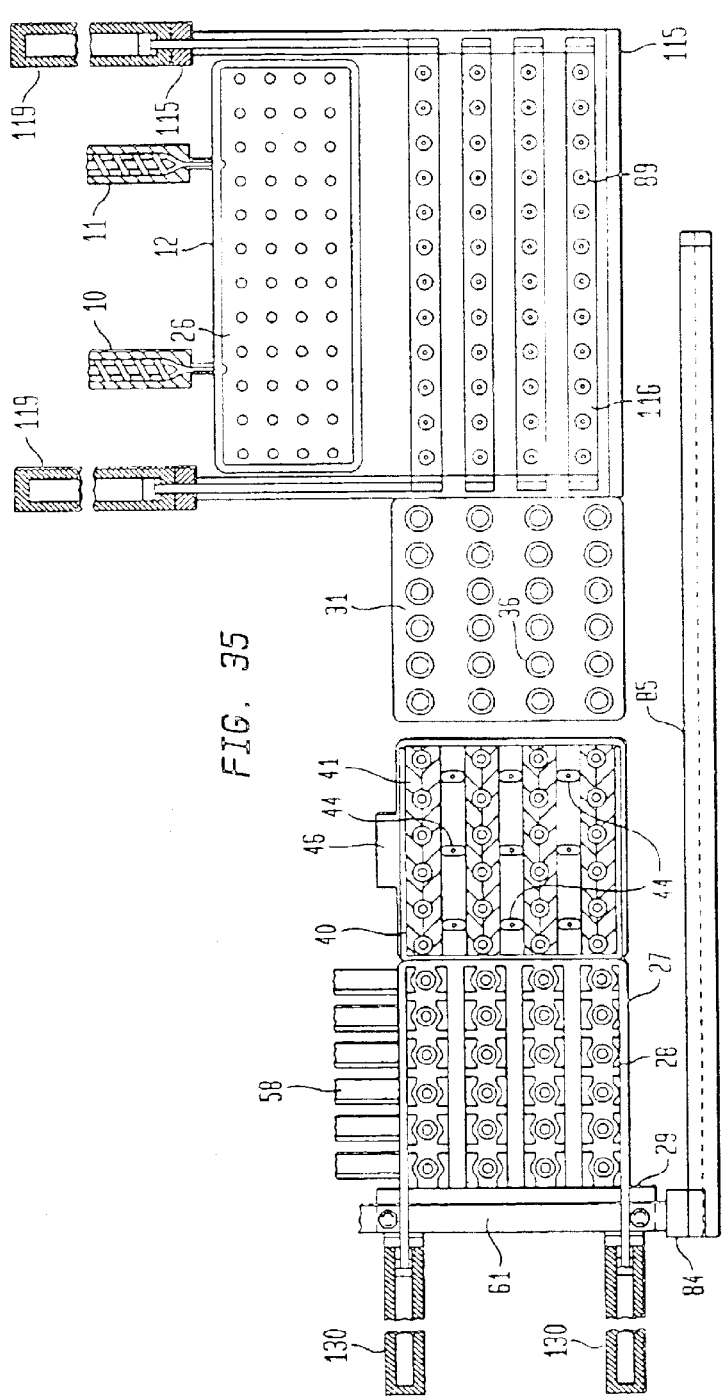

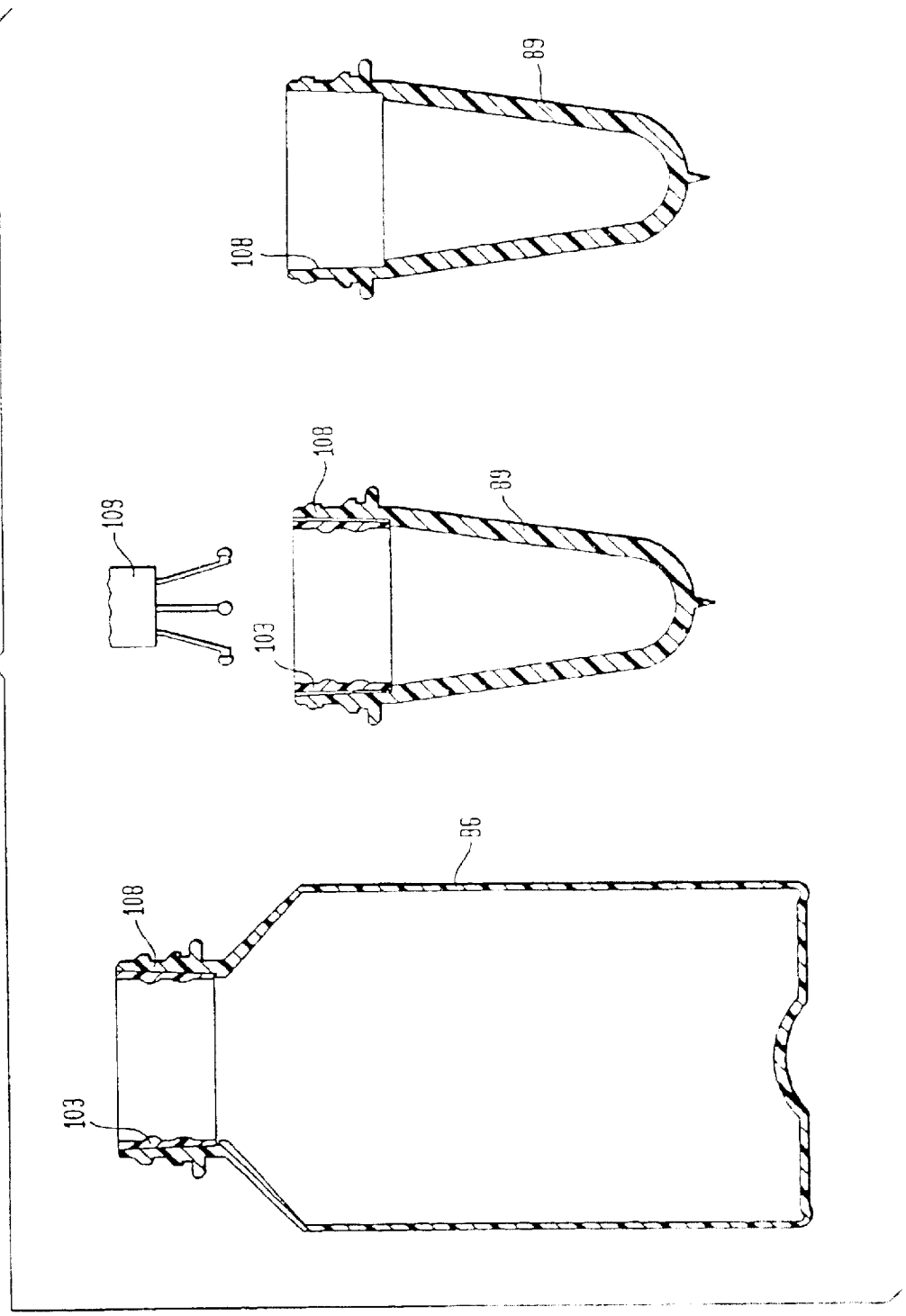

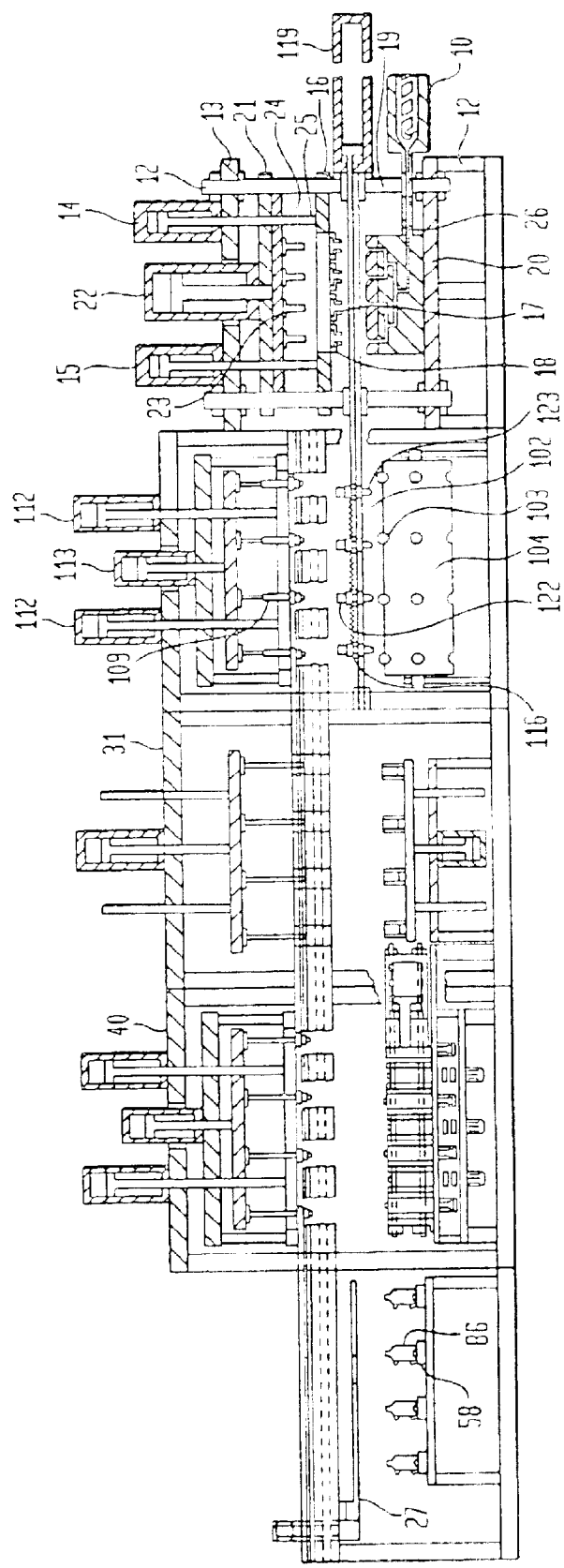

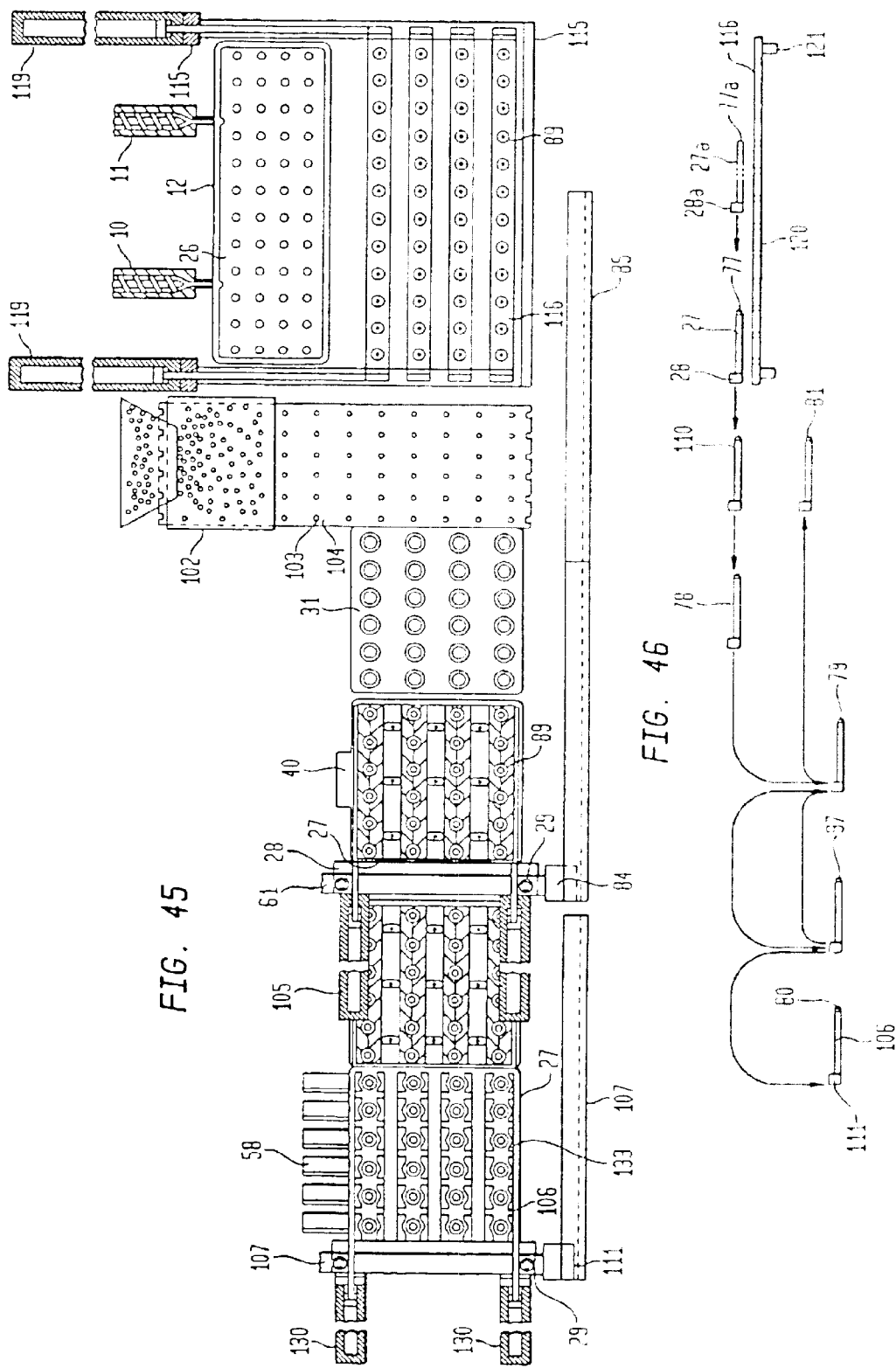

SINGLE-ROW AND MULTI-ROW STRETCH BLOW MOLDING METHOD AND APPARATUS THEREFOR

BACKGROUND OF THE INVENTION

1. Field of the Invention

This invention relates to a method for the preparation of preforms and hollow articles in single-row and multi-row preform and blow molds, respectively, and to an apparatus therefor. The invention represents an improvement in applicant's prior U.S. Pat. No. 6,217,819 entitled Universal Single Row and Multi Row Insert Stretch Blow Molding Method and Apparatus Therefor. More particularly, the present invention relates to a method and apparatus, wherein during a preform mold opening stroke an entering tray unit collects and removes molten preforms from the molding area. This end is attained by means of a robotic gripper assembly which lifts the preforms either out of the tray unit or from a preform reheat unit, transfers the preforms through different processing phases, adding internal and external components during the transformation into hollow articles, and returns to a waiting position outside the preform molding and tray unit or preform reheat unit.

2. Brief Description of the Prior Art

Heretofore, in conventional prior art molding machines, known as the one-step method, preforms, also called parisons, are injected into a preform mold and transferred by their neck splits which are mounted beneath a horizontal transfer plate in an intermittent rotary motion into a temperature control station, also called conditioning station, an orientation blow molding or stretch blow molding station and a molded product removing or ejection station producing hollow articles in single and double row molds, respectively., as described in U.S. Pat. Nos. 4,946,367, 4,731,011 both to Nissei ASB and Pat. No. 4,457,689 to Aoki respectively. The advantage of this method is that the preforms being held in an upright position can be precisely heat profiled internally with entering touch or conditioning rods. The drawback of this method is that the molten preforms are required to reside in the conditioning station as long it takes to inject and cool the preforms in the preceeding injection station. Heat pots emanating radiant heat are needed to maintain the proper stretch blow temperature, which adversely effects the programmed temperature profiling by the touch or conditioning rods. A technique for overcoming such limitations is described in U.S. Pat. No. 4,941,816 to Aoki U.S. Pat. Nos. 5,062,787 and 5,364,585 both to Aoki Technical Laboratory and U.S. Pat. No. 5,403,177 to Jomar wherein the injected preforms are directly heat conditioned in the preform mold and then immediately transferred into the stretch blow mold. The drawback of this method is that the preform molds are tailored to a specific hollow article geometry. This reduces the number of different hollow article shapes that can be stretch blown from the same preform shape. Unfortunately, such machines also evidence certain limitations, namely in the difficulty of mold interchangeability due to different swing radii and stack heights, the lack of built in automatic oriented discharge and costly neck splits and neck split holders which are required for each station. The vertical clamping forces applied to the neck splits in the preform molds versus the horizontal clamping forces in the blow molds being mounted onto a common rotary plate causes premature wear and tear to the aligning neck split seats. The rotary plates and the machine beds are required to be laid out for the higher clamping forces in the injection station. As a result, the added inertia of the heavy construction and large swing radii of the transfer plates lengthens the dead time of mold open index and mold close, thereby increasing the overall cycle times. Efforts to reduce dry cycle times have been made, as for example, by replacing the rotary tables through closed circuit conveying devices as described in U.S. Pat. No. 4,895,509 To Giacobbe-Magic and U.S. Pat. No. 5,213,822 to Nissei ASB. However, once again, costly support jaws or neck mold sets mounted on slide guides, are required for each station linked together to transfer the preforms and containers through the forming phases in a rectilinear motion in equal distances and equal time intervals. In the rotary-type and chain-link-type method, all phases of preform molding, conditioning, stretch blowing, and discharging are also interdependent due to a common transfer movement. The larger the number and size of transfer components, especially expensive neck splits, for each processing station leads to longer mold changeover times and higher tooling costs. The more machine component weight needs to be transferred, so resulting in slower dry cycles, and thus longer overall cycles.

The industry has recognized these limitations and has also recognized that containers can be conditioned, stretch blown, and discharged in a fraction of the time that it takes to mold the preforms. This discovery has led to a method and apparatus for injection stretch blow molding as described in U.S. Pat. No. 5,468,443 to Nissei ASB wherein a larger number of injection molding stations produce preforms to be conveyed to a lesser number of stretch blow molding stations. The drawback of this method and apparatus is that it requires neck split moving means for supporting and conveying costly neck splits adapted to hold-neck portions of each preform used to mold the hollow articles through all preform molding, conditioning, blow molding, and ejection stations.

Refinements of the aforementioned patent, U.S. Pat. No. 5,468,443 to Nissei ASB are described in U.S. Pat. No. 4,793,960 to Husky, U.S. Pat. Nos. 5,753,279, 5,744,176 and 6,247,916 all to Nissei ASB as well as brochures of Gerosa's Satellite GE system, SIG's Ecomax injection stretch blow molding machine and HUSKY's Index SB system are also known as one and a half step methods wherein molded preforms are first inverted to be released onto carrier members of a circular transfer conveying system. The inverted preforms are then indexed through a reheating section to assure that the first fraction of molded preforms enters the blow mold station with the same temperature profile as the following fractions of simultaneously molded preforms. Once the preforms are stretch blown into final hollow articles, they are inverted again to release them in an upright position. The limitations of these disclosures resides in the fact that the molten preforms are being inverted to be put onto a multitude of neck-size-dependent carrier members. During the inverting process the outside walls of the preforms touch water cooled transfer tubes in an uncontrolled manner, which tends to alter their thermal profile, so leading to uneven wall distributions in the finished hollow articles. The carrier members create a heatsink below the neck areas and, therefore, the reverted preforms need to be excessively heated in the shoulder area, which with long preforms may lead to bending during the intermittent transfer movements. The residence time of each fraction of preforms before entering the reheat oven banks is longer than each following fraction while the residence time in the reheat oven banks is the same for each preform fraction which enters the blow molds consecutively. The bottom up stretch blow molding method reverses the temperature profile of the preforms in the longitudinal direction. The bottom area of the preforms is hotter due to the chimney effect, which leads to preform-sagging and thinner bottoms and heavier shoulders in the hollow articles. Energy consuming cooling fans are installed to overcome this drawback. Preferential heating zones radiate onto the already hot preform outside walls for the production of oval hollow articles. This heat treatment of vertical section of the body of the preform is practiced successfully in so called two-step or reheat stretch blow molding processes because the preforms enter the heating sections at room temperature closely spaced and allow long oven residence times, as disclosed in U.S. Pat. No. 5,681,521 to Sidel and U.S. Pat. No. 6,287,507 to Corpoplast. A second inverting device is needed to release the finished hollow articles in an upright position. The number of injection cavities vs. blow cavities being mechanically coupled remains at a fixed ratio which limits the processing flexibility for instance for lighter-wall vs. heavier-wall containers. A further stretch blow molding concept is described in U.S. Pat. Nos. 4,372,910 and 4,470,796 both to Van Dorn in which molded preforms are picked up by two-row multiple gripper transfer devices, then inserted one row at a time into neck-size dependent collars of the respective closed circuit transportation system to be subsequently indexed to the conditioning, stretch blow and ejection stations. The drawback of this system is that the preforms need to be inserted into a large number of neck-size dependent collars of a transportation system consisting of a common closed loop belt drive which does not allow any timing flexibility between the simultaneous conditioning and stretch blow phases and precludes physical internal heat profiling with touch rods to obtain maximum processing flexibility. As described in European Patent. No. EP 0,768,166B1 to Sipa the thermal conditioning system is required to be twice as long as the stretch blow system to ascertain uniform temperature profiles for the first and second row preforms being introduced. U.S. Pat. No. 4,197,073 to Husky teaches a method, wherein alternate sets of parisons are released into laterally diverging tracks before arriving at the blow-molding unit. Despite the reduction in the number of blow mold cavities, in the end, the number of blowing means is equal to the number of preform mold means. U.S. Pat. No. 4,209,290 to Husky discloses a method wherein blow molding cells are interposed between open injection mold halves and injection cores with their preforms descending into the blow molding cells to form finished bottles. The limitation of this method is that the preform-molding cycle is interrupted during the time it takes to blow-mold the bottles. U.S. Pat. No. 4,310,282 to Emhart-Spurr uses a neck ring carrier to remove the parisons as a group to substitute this transfer with an assembly for the removal by the neck ring carriers which form a portion of the molded parison and a lateral transfer mechanism for positioning the parisons for delivery to the shuttle for final delivery to the blow station. U.S. Pat. No. 4,370,121 to Valyi discloses a multiplicity of tempering molds in spaced relationship to each other for retaining and tempering parisons prior to orientation and blowing. A well suited process for high output production of oriented hollow articles called the two-step method is disclosed in U.S. Pat. No. 6,152,723 to Krones, U.S. Pat. No. 5,863,571 to Sidel and U.S. Pat. No. 4,479,772 to Corpoplast whereby preforms are injection molded, cooled and stored in one location and then transported to a second location where they are unscrambled to be introduced into a reheat stretch blow molding machine. However at equivalent output rates the invention of a single and multi-row one and a half step stretch blow molding method and apparatus based on injection molding technology incorporating quick mold change means (not shown) presents numerous advantages over the two-step method in energy savings, mold change over times, transportation and double handling costs of preforms, less overall floor space requirements and less manpower. In integrated aseptic injection/stretch blow and filling lines the principal advantage over the two-step method is the elimination of chemical sterilants because both the molten preforms and hollow articles are kept sterile when they enter the aseptic filling system. This yields immediate savings in raw material costs and eliminates costly sterilizing/rinsing systems from the line. It prevents the taste of the hollow article contents being altered by residues of sterilants.

U.S. Pat. No. 5,731,014 to Tradesco, U.S. Pat. No. 4,718,845 to Sheffield, and U.S. Pat. No. 4,706,924 to de Larosiere disclose a solution for gaining maximum utilization of molding machines by simply switching mold cavities instead of complete molds in both stack molds and single-face mold versions clamped between a fixed and movable machine platen. This solution works well in conventional injection molding machines. However, in stretch blow molding machines, secondary components such as conditioning rods, blow cores, stretch rods, and bottom plugs, etc. need to be introduced at a predetermined center distance row. European Patent No. EP 0,768,165-A2 to Sipa teaches a method wherein mutually coupled mold plates, connected to a power transmission means, actuate through motion transferring means a double pair of mold halves. U.S. Pat. No. 4,941,816 to Aoki describes a double row clamp molding machine, wherein each blow mold row is closed by lateral pneumatic moving means. Subsequently, pancake cylinders rise between the two rows and expand to apply the necessary clamp pressure against oppositely located clamping means. Both methods are limited to a fixed number of two rows of blow molds at a fixed machine-dependent center row distance. U.S. Pat. No. 6,089,852 to Tradesco discloses a centering arrangement for controlling relative movement between a series of mold support plates in a multi-level stack mold having first and last mold support plates attachable respectively to a fixed and a moveable platen of an injection molding machine and at least two intermediate mold support plates interspersed sequentially therebetween.

U.S. Pat. No. 5,653,934 to Electra Form-Brun discloses a method for removing molded articles from a molding machine whereby article engaging elements comprising a plurality of pairs of elongated bars are placed into channels of the mold body as integral parts of the mold cavities to pick up molded preforms as soon as the mold opens, thereby eliminating the entering stroke for the removal grippers. The drawback of this method is that the available mold width is reduced by the channel spacings needed for the gripper means to enter during the molding phase. U.S. Pat. No. 6,129,883 to Husky discloses a vertical clamp index machine wherein molten preforms are ejected onto a conveyor into receiving means comprising cooled carriers. U.S. Pat. No. 5,273,152 to Electra Form and U.S. Pat. No. 3,753,589 to Holstein & Kappert disclose apparatuses and grippers for altering the center spacing of the article in two directions simultaneously from the first center spacing of the downstream workstation to the second center spacing of the upstream workstation through plate means having a plurality of angled grooves, and a plurality of support members mounted slidably on the plate means. U.S. Pat. No. 4,323,341 to Valyi discloses means for varying the center spacing of the parisons to optimize the parison temperature for orientation and blowing by changing the center spacing of the parison mold and pick up of the parisons with a second set of cores having a center spacing of the blow molds.

U.S. Pat. Nos. 5,362,437 and 5,169,654 both to Nissei ASB disclose a method and apparatus whereby two rows of preforms are conveyed to a blow molding stage by changing the row pitch between the supporting plates when the blowing molds are opened and when the blowing molds are closed for the purpose of reducing the blow molding system in size and occupying area.

U.S. Pat. No. 5,683,729 to Sidel, U.S. Pat. No. 5,110,282 to Nissei ASB, U.S. Pat. No. 4,824,359 to Hoover Universal, and 4,403,907 to Emerson Electric disclose cam-driven rotary pick and place assemblies, which simultaneously carry preforms and hollow articles through the blow molding and release phases. The limitation of such carrying means is that their rotary motion is interdependent, requires space modifying devices and, therefore, does not allow any timing and stroke distance flexibility between the various processing phases. A method for adding external components such as labels, handles, or valves to the preforms or hollow articles is described in U.S. Pat. Nos. 4,479,771 and 4,721,451 both to Plastipak, wherein components, such as labels, are picked up from dispensing heads by the label carrier shuttle and are moved rectilinearly into an open mold wherein they are released onto the mold cavity walls and returned in the same manner to the dispensing head position. The drawback of this method is that the normal blow molding cycle of rotary machines is interrupted to allow the time to introduce the labels into the open mold cavities. Typically, finished containers have to be evacuated first and new preforms need to be delayed from entering the open mold cavities. U.S. Pat. No. 4,983,348 to Wheaton partially overcomes this limitation by opening the upper mold half earlier and inserting labels into the open mold half while holding the previously blown and labeled work pieces or hollow articles in the lower mold half for the duration of the label transfer phase without increasing the overall machine cycle time. The drawback of this method is that only one mold half can receive labels and the distance between the work piece and movable blow mold halves needs to be sufficient to allow the dispensing mechanism to operate in between.

To add secondary components to preforms or hollow articles, U.S. Pat. No. 5,678,771 to Graham Packaging teaches a method wherein an insert is attached on the surface above the threads of a neck finish to maintain stability during and after hot-fill processing. The drawback of this method is that the non-oriented, amorphous neck finish portion beneath the attached reinforced insert can shrink and deform during the hot-fill phase. U.S. Pat. No. 4,988,472 to Nissei ASB teaches a method that prevents the aforementioned-mentioned drawback. However, the insert is placed into a neckring portion of an open mold first and then over-molded with molten material, an operation that lengthens the overall cycle.

U.S. Pat. No. 4,847,129 to Continental PET teaches a method of molding a multi-layer neck-finish structure whereby the center layer consists of a high temperature polymer.

U.S. Pat. No. 5,651,933 to Plastipak and U.S. Pat. No. 3,939,239 to Valyi teach a method wherein thermoformed sleeves are put on injection cores and are over molded to obtain a multi-layer preform. The inner over molded layer needs to be stiff enough to withstand the following injection pressures when injecting the outer layer. Thus, this method requires more costly inner barrier material and is more difficult to bond with the over molded material.

U.S. Pat. No. 5,516,274 to Electra Form describes a movable blow mold clamp assembly permitting improved access for servicing.

SUMMARY OF THE INVENTION

1. Purposes of the Invention

It is an object of the present invention to mold preforms in single-row or multi-row preform mold cavities in variable-row spacings to give the molder maximum flexibility in meeting small and large production output requirements. Preform molds can be mounted perpendicular or in line relative to one or several plasticizers.

It is a further object of the invention to enter a tray unit with at least one row of tray plates in between the opening preform mold to collect ejected preforms from above mold halves into their corresponding openings and immediately retract away from the preform molding area.

It is a further object of the invention to hold ejected preforms from above mold halves in corresponding openings of the non heat conducting tray plates with their respective transfer rings.

It is a further object of the invention to hold ejected preforms without transfer rings from above mold halves with their bottom gate sections in non heat conducting catch baskets mounted beneath the tray plate openings It is a further object of the invention to enter a tray unit with a corresponding number of tray rows than preform mold rows in between the opening preform mold to collect ejected preforms from above mold halves into their corresponding openings and immediately retract away from the preform molding area.

It is a further object of the invention to enter a tray unit with a corresponding number of tray rows than preform mold rows in between the opening preform mold to collect ejected preforms from above mold halves into their corresponding openings and immediately retract away from the preform molding area into the conditioning unit.

It is a further object of the invention to retract the multitude of tray rows away from the molding area in a telescoping manner to align the multitude of tray plate rows with the center row distances of the downstream units.

It is a further object of the invention to transfer the preforms from the tray unit to the downstream units in an upright position.

It is a further object of the invention to utilize a robot with a universal gripper assembly which picks up molded preforms from the retracted tray unit and transfers the same across a conditioning unit into a stretch blow unit to be converted into hollow articles, and then transfers them onto an oriented discharge unit at variable time and stroke intervals before returning to a waiting position at the preform molding unit and the tray unit.

It is a further object of the invention to freely move the robot with the universal gripper assemblies in horizontal and vertical directions to position the preforms into the different processing units to condition, stretch blow and discharge the same.

It is a further object of the invention to lay out the grippers at a multitude of center distances to enable the transfer of preforms and hollow articles with different size neck finishes and at various mold cavity center distances.

It is a further object of the invention for a universal gripper assembly to pick up the molten preforms from the tray unit at the center distance spacings of the preform mold and to telescope the molten preforms into center distance spacings corresponding to the center distance spacings of the blow mold cavity center distances It is a further object of the invention to utilize a robot with a universal gripper assembly which picks up fractions of molded preforms consecutively from the retracted tray unit and transfers the same across a conditioning unit and into a stretch blow unit to be converted into hollow articles, and then transfers them onto an oriented discharge unit at variable time and stroke intervals before returning to a waiting position at the preform molding and tray unit.

It is a further object of the invention to condition each fraction of preforms consecutively, internally by rows of touch rods, externally by rows of heat pots. It is a further object of the invention whereby a primary robot with a universal gripper assembly picks up a fraction of conditioned performs, transfers the same into at least one row of a stretch blow unit and returns to the conditioning unit to pick up a subsequent fraction of conditioned performs from the tray unit and whereby a secondary robot with a universal gripper assembly picks up hollow articles from at least one row of the stretch blow unit and transfers them onto an oriented discharge unit.

It is a further object of the invention whereby a robot with a universal gripper assembly picks up fractions of conditioned molten preforms from a tray unit transfers them into a stretch blow molding unit and discharge unit which returns to the tray unit to pick up a subsequent fraction of conditioned molten preform to be transferred into the downstream units and eventually returns to a waiting position at the preform molding and tray unit.

It is a further object of the invention whereby a multitude of robots with universal gripper assemblies pick up fractions of conditioned molten preforms from a common tray unit, transfer them into a multitude of stretch blow molding and discharge units and return to their respective waiting positions at the preform molding and tray unit.

It is a further object of the invention to maximize the production capabilities through stack blow molds, wherein the blow mold opening and closing strokes are accelerated by the clamp moving means together with a multitude of helical spindles with helical nuts mounted onto the diverging and converging blow mold clamp platens and pivoting spacing platens aligning the center row distances of the corresponding stretch rod, blow core, and bottom plug assemblies. The number of spacing-platen rows can be increased or decreased according to the desired number of blow mold rows.

It is a further object of the invention to vary the number of center row distances in the conditioning, stretch blow, and bottom plug units according to the number of center rows of the preform molds.

It is yet a further object of the invention to turn the conditioning and stretch blow mold units to match the number of perform mold rows.

It is yet a further object of the invention to reduce the number of blow mold cavities to a fraction of the number of perform mold cavities.

It is a further object of the invention to collect at least two rows of molten preforms in the openings of the tray plates of the tray unit at the center row distance of the preform mold cavities and telescope the molten preforms into the center row distances of the blow mold cavities during the retracting movement of the tray unit out of the molding area. It is a further object of the invention to add additional blow mold units for multi-stage stretch blow mold applications.

It is a further object of the invention to add a secondary robot with a secondary universal gripper assembly to transfer pretreated hollow articles from the first blow mold unit into subsequent blow mold and discharge units.

It is a further object of the invention to add component transfer devices to pick up components during the blow-molding phase and to introduce these components into the open blow molds during the waiting phase.

It is a further object of the invention to insert components on the neck inside of preforms before the shrinkage phase of the molten material has been completed.

It is a further object of the invention to insert components on the inside of the preform walls prior to the conditioning and stretch blow-molding phase.

It is a further object of the invention to pivot the gripper assembly to pick-up reheated preforms from a lateral reheat oven assembly.

It is a further object of the invention to mount the upper conditioning and blow-clamp assemblies onto linear bearings, so enabling the movement of said clamp assemblies laterally to facilitate mold and machine component mounting.

2. Brief Description of the Invention

In accordance with the present invention, molten material is introduced into single-row or multi-row preform mold cavities. Upon completion of the solidification phase, the upper mold half is raised together with the injection cores. Immediately thereafter, during the mold-opening stroke, a tray unit with at least one row of tray plates enters between the movable mold halves collects the molten preforms through corresponding openings in the tray plates and retracts immediately out of the molding area. The preforms are either held onto the tray plates by their transfer beads or in the absence of such transfer beads by their bottom gate sections in catch baskets mounted beneath the corresponding openings of the tray plates. A robot with a universal gripper assembly then lifts either all or consecutively a fraction of the preforms out of the retracted tray unit and transfers the preforms to the conditioning unit, while the preform mold is closed again to mold the next set of preforms. The robot with the universal gripper assembly holds the preforms in the conditioning unit just long enough for the internal touch rods and external heater pots to monitor the temperature profile in the preforms. Next, the robot with the universal gripper assembly brings the conditioned preforms into the blow molds, wherein, after the bottom plugs have been raised and the blow molds have been closed, the blow cores and stretch rods descend to enter the preforms at their open ends, low and high pressure blow air comes on and forms finished hollow articles. Immediately upon completion of the stretch blow cycle, the blow cores and stretch rods lift out of the blow molds, the blow molds are opened, and the robot with the universal gripper assembly lifts the finished hollow articles out of the blow mold cavities to transfer the same into the oriented discharge unit. The robot with the now empty universal gripper assembly returns to a waiting position at the preform molding and tray unit Due to the fast cooling nature of certain materials, such as PET or PEN, among others, the time periods necessary for conditioning, stretch blowing, cooling, and oriented discharging, as well as for the short and quick transfer strokes of the servo controlled robot with its light-weight universal gripper assembly and with its reduced inertia happen within a fraction it takes to mold the preforms. This benefit allows picking up the molten preforms with the universal gripper assembly in fractions as well and transferring the same through the downstream processing units having a lesser number of blow mold cavities than preform cavities.

In addition to the preform supply from the molding unit, outsourced preforms from an adjacent reheat unit can be supplemented. During this intermediate phase, the universal gripper assembly pivots and picks up reheated preforms from said reheat unit and transfers them the same way in a short linear movement through the conditioning, stretch blow, and oriented discharge phases.

In view of the freely programmable and time-independent movement of the robot with the universal gripper assembly, following component transfer devices can be added. During the stretch blow phase, these transfer devices pick up components such as labels, handles, valves, etc. When the robot with the universal gripper assembly has returned to the waiting position, the components are released into each blow mold half, all without any increase in the total cycle time.

The above described process shows that the number of blow mold cavities is either equal to or a fraction of the number of preform mold cavities. To further boost production and to gain maximum utilization of the preform-molding unit, stack-blow molds are installed to meet the production of a larger number of preform mold cavities. The blow-mold clamp requirements are virtually the same with single-row or multi-row blow mold assemblies. A selectable number of helical spindles with helical nuts and pivoting spacer platens, located between the blow mold rows, provide instant mold opening and closing as well as parting-line alignment with the entering bottom plugs, blow core and stretch-rod assemblies mounted in a stationary position. A synchronized movement of the enveloping tiebar mounted blow-mold clamp platens and generated by the closing means provides the final blow-mold clamping pressure. The helical spindles with helical nuts mounted onto the blow mold clamp platens accelerate the blow mold opening and closing strokes in conjunction with the pivoting spacing platens movements. The spacing platens being connected to the intermediary blow mold clamp platens follow and are reversed by the diverging and converging clamp movement at low friction. A central step motor and gear pulleys mounted beneath onto each spacing platen enveloped with a common drive belt amplifies the pivoting movement against mechanical stops (not shown) to ascertain perpendicularity positioning during the mold closing phase. The fully mechanical stack blow mold assembly with its synchronized clamp movements and mold height adjustments via tooth belted tie bar nuts and electrical drive is also well suited for heat set container production. The stretch blow assemblies located above the stack blow mold clamps are adjustable within the center row distances to align with the respective blow mold parting lines.

The injection cores, conditioning and stretch blow rods are held onto individual clamp bars. The clamp bars are bolted individually onto the machine clamp platens according to the center distance rows of the blow-mold cavities. The neck splits or stripper plates and the blow cores are also mounted on individual clamp bars. These clamp bars are bolted individually onto frame-type machine clamp platens within the respective units. This flexibility in varying the center row distances in the individual processing units or by telescoping the tray plates of the tray unit into the center row distances of the down stream units during the molten preform discharge stroke as well as telescoping the universal gripper means from the center distances of the preform molds to the center distances of the blow molds permits the mounting of existing molds from other stretch blow processes, or adding or deleting mold cavity rows, thereby increasing or decreasing mold opening daylights for the production of larger and smaller hollow articles, respectively.

The injection, conditioning, stretch blow and oriented discharge units can be turned based on the preform mold design to minimize the number of universal gripper assemblies.

Certain molten materials such as PC or PP, heavy-wall returnable PET bottles or heat-set PET bottles may require stepped processing treatments to achieve specifications. In this case, additional blow-mold units and a secondary robot with a universal gripper assembly are installed. In this processing mode, once the primary robot with the universal gripper assembly has transferred the preforms into the first blow-mold assembly, it returns to the waiting position at the preform-molding machine. A secondary robot with a universal gripper assembly picks up the pretreated preforms and transfers them directly to one or several subsequent blow mold units and finally to an oriented discharge unit.

Hollow articles tend to deform in non-stretch blow-molded areas such as the neck finishes during hot-fill operation. A unit capable of transferring internal components into preforms may be installed right after the preform-molding unit and above the tray unit. An internal component transfer device picks up heat-stable sleeves from a sorting conveyor and incorporates the same into the open-ended preforms at elevated neck temperatures, thus before the shrinkage phase has been completed. The robot with the universal gripper assembly picks up the sleeve-reinforced preforms and transfers them to a conditioning unit, wherein the cooling neck finishes shrink tightly onto the heat-stable sleeves. After passing through one or several stretch blow units, neck heat-stable hollow articles are released into an oriented discharge unit.

To enhance the barrier properties of hollow articles, a thin inner liner of high-barrier material can be inserted the same way into the preforms by the internal component transfer device prior to transferring the same into a conditioning and stretch blow unit.

The above-described stretch blow molding method and apparatus provides the molder with maximum production flexibility by forming hollow articles in either single-row or multi-row blow-mold assemblies as well as processing versatility in adding additional stretch blow mold units and introducing external and internal components to the hollow articles. The open architecture of the individual processing units permits the installation of molds from different machine designs and requires one set of neck splits in the preform mold only. The completely separate preform molding unit from all other processing units and preform pick-up from a tray unit allows quick mold opening and closing of the preform mold clamp. All the downstream phases described above happen within the preform-mold filling, forming, cooling and take out phases. Thus, the preform-molding phase and the rapid mold opening preform take-out by a tray unit and mold-closing phase constitutes the total processing cycle.

Adding an additional reheat unit further increases the output capabilities of the stretch blow-molding machine to meet seasonal market demands.

Prior art for robotic gripper assemblies requires removal of preforms from a molding unit or finished hollow articles from an ejection or blow-mold station of a stretch blow-molding machine when in a static position and placing them onto conveying means. The improvement described herein involves the use of a tray unit and a robot with a universal gripper assembly to pick up molded preforms in total or in fractions in an upright position from a tray unit which have been collected from a preform molding unit during the mold-opening stroke or from a reheat oven and transferring them at freely programmable intervals to a multitude of individual processing units performing multiple functions, such as conditioning, stretch blowing, adding internal or external components, or hand-over pre-treated hollow articles to subsequent stretch blow units prior to final release of the finished hollow articles. In this capacity, the tray unit and the robot with the universal gripper assembly replaces the use of heavy rotary transfer plates carrying neck splits for each station, or circulatory carriers with neck-mold moving pieces, or carriages with neck-size-dependent support jaws, each being linked together in a closed circuit.

Prior art for multi-row blow-mold clamps requires that each blow mold row be first closed by pneumatic external moving means. Subsequently, a pancake cylinder assembly is raised in between the rows which are expanded to apply the necessary clamp pressure against opposite clamping cylinders on each end, or a power transmission means is used to actuate, through motion-transferring means, a double pair of mold halves only.

In accordance with the present invention, a multitude of helical spindles with helical nuts and pivoting spacing platens are mounted to instantly create a mechanical blow mold row opening and closing action within selected center distance rows. Synchronized peripheral clamping means are used simultaneously to apply the necessary opening and closing force. A further refinement involves the flexibility of adding or deleting spacing platens depending on the desired number of blow-mold rows. The benefits to the molder are to adapt production outputs to market demands within the same stack-mold clamping means. The higher output rate capabilities of stack-blow-mold assemblies make in-line hollow article filling and pasteurization economical with the one-step and one and a half step process.

BRIEF DESCRIPTION OF THE DRAWINGS

The invention will be more readily understood by reference to the following detailed description taken in conjunction with the accompanying drawing wherein:

FIGS. 4–11 represent a schematic sequence of a robot with a universal gripper assembly, followed by a transfer component device assembly in conjunction with a tray unit and a stretch blow molding sequence;

FIG. 4 shows a schematic side view of a robot with a universal gripper assembly picking up a molded preform and a transfer component device assembly in a stand-by position;

FIG. 5 shows a schematic top view of a stretch blow molding sequence showing from right to left a plasticizer, a preform-molding unit, a tray unit, a conditioning unit, a stretch blow molding unit in a closed position with external components applied, and an oriented discharge unit;

FIG. 6 shows a schematic side view of a robot with a universal gripper assembly holding a hollow article with external components applied as well as a transfer component device assembly in an external component pick-up position;

FIG. 7 shows a schematic side view of a robot with a universal gripper assembly in a finished hollow article discharge position at a tray plate of a tray unit and a transfer component device assembly holding external components on a front and back side;

FIG. 8 is a schematic top view of a stretch blow molding sequence showing from right to left a plasticizer, a preform molding unit with a tray unit in a molten preform discharge position, a conditioning unit, a stretch blow molding unit in an open position ready to receive external components by a transfer component device assembly, a universal gripper assembly in a waiting position, and an oriented discharge unit;

FIG. 9 shows a schematic side view of a robot with a universal gripper assembly in a waiting position and a transfer component device assembly in an external component-release position;

FIG. 10 shows a schematic top view of a stretch blow molding sequence showing from right to left: a plasticizer, a preform molding unit with a tray unit in a preform discharge position, a conditioning unit, a stretch blow molding unit in an open position holding external components, such as labels in each mold half, a transfer component device assembly in a component-pick-up position and a universal gripper assembly in a stretch blow position, front and back component-dispensing cartridges, above an oriented discharge unit;

FIG. 11 shows a schematic side view of a robot with a universal gripper assembly ready to pick up a preform from a tray plate and a component transfer device assembly in an external component stand-by position;

FIG. 15 is a top view of a single-row stretch blow molding apparatus with a robot and a pivoting universal gripper assembly picking up preforms from a reheat unit and transferring the same through a conditioning and stretch blow unit into an oriented discharge unit;

FIG. 16 shows a schematic side view sequence of a robot with a universal gripper assembly in a pivoted position, picking up reheated preforms from a reheat unit, pivoting back to its basic position to bring them to a conditioning unit, releasing them into a stretch blow unit for transforming into hollow articles, retracting them toward an oriented discharge unit, and returning to a reheat unit or tray unit;

FIG. 24 shows the top view of a tray unit in a preform molding unit with tray plates in a retracted preform collecting position;

FIG. 25 shows the front view of a tray unit in a preform molding unit holding molten preforms in a tray plate by their transfer beads;

FIG. 26 shows the front view of a tray plate with catch baskets holding molten preforms without transfer beads;

FIG. 35 shows the top view of a multi row one and a half step stretch blow molding assembly with two plasticizers, a preform molding unit with a multi row preform mold and a multi row tray unit, a conditioning unit, a stack blow mold unit, a gantry robot with a telescoping universal gripper assembly and an oriented discharge unit beneath;

FIG. 36 shows a schematic movement of a universal gripper assembly from right to left at a fractional pick up position of molten preforms from a tray unit, traversing a conditioning unit, descending onto a stretch blow unit, retracting to an oriented discharge unit, returning to the tray unit to pick up a subsequent fraction of molten preforms (not shown);

FIG. 42 is a sequential view from right to left of a molded preform with internal component preparation, an internal component pick-up and inserting device, a molded preform with an inserted internal component and a finished hollow article with an inserted internal component;

FIG. 44 shows a side view of a multi-row stretch blow molding apparatus as described in principle in FIG. 28 from right to left a plasticizer, a preform molding unit with a multi-row tray unit including catch baskets holding molten preforms without transfer beads, an internal component-indexing sorting and conveying unit, a conditioning unit, a stretch blow molding unit, a robot with universal gripper assembly, a secondary robot with a secondary universal gripper assembly above an oriented discharge unit;

FIG. 45 shows a top view of a multi-row stretch blow molding apparatus a shown in principal in FIG. 35 from right to left the plasticizers, a preform molding unit with a multi-row tray unit, an internal component-indexing sorting conveyor unit, a conditioning unit, a primary stretch blow molding unit, a primary gantry robot with a universal gripper assembly, a secondary stretch blow molding unit, a secondary gantry robot with a secondary universal gripper assembly above an oriented discharge unit;

FIG. 46 shows a schematic side view sequence of a primary and a secondary robot with universal gripper assemblies from right to left the primary robot with the universal gripper assembly picks up a fraction of preforms (not shown) from a tray unit, indexes to an adjacent internal component-indexing sorting and conveying unit, travels to a conditioning unit, releases the preforms into a primary stretch blow molding unit, returns to a waiting position, and at the tray unit to pick up another fraction of molten preforms. In the meantime, a secondary robot with a universal gripper assembly picks up the pretreated preforms (not shown) and transfers the same into a secondary stretch blow molding unit and oriented discharge unit.

DETAILED DESCRIPTION OF THE INVENTION

In accordance with the present invention there is provided a single-row and multi-row stretch blow molding method and apparatus, wherein a tray unit with at least one row of tray plates collects molten preforms from a preform-molding unit during the mold-opening stroke and guides them out of the molding area. A robot with a universal gripper assembly picks up the molten preforms in an upright position and guides them through the steps of conditioning, stretch blow molding, oriented discharging, and then returns to a waiting position at the preform-molding unit and tray unit. The freely programmable time and stroke intervals of the robot with the universal gripper assembly to complete the stretch blow molding process are substantially faster than the preform molding process and thus allows the pick-up of fractions of preforms sequentially or additional preforms from a reheat unit and the introduction of components to the external and internal walls of the hollow articles without increasing the overall cycle. A modular stack-blow-mold assembly provides the opportunity for increased production in the same blow molding apparatus. A secondary set of robots with universal gripper assemblies and blow mold units provide the opportunity to treat the preforms in multi-stages before being released as hollow articles into an oriented discharge unit or further increase the output rates of the stretch blow molding system.

Figure 1:
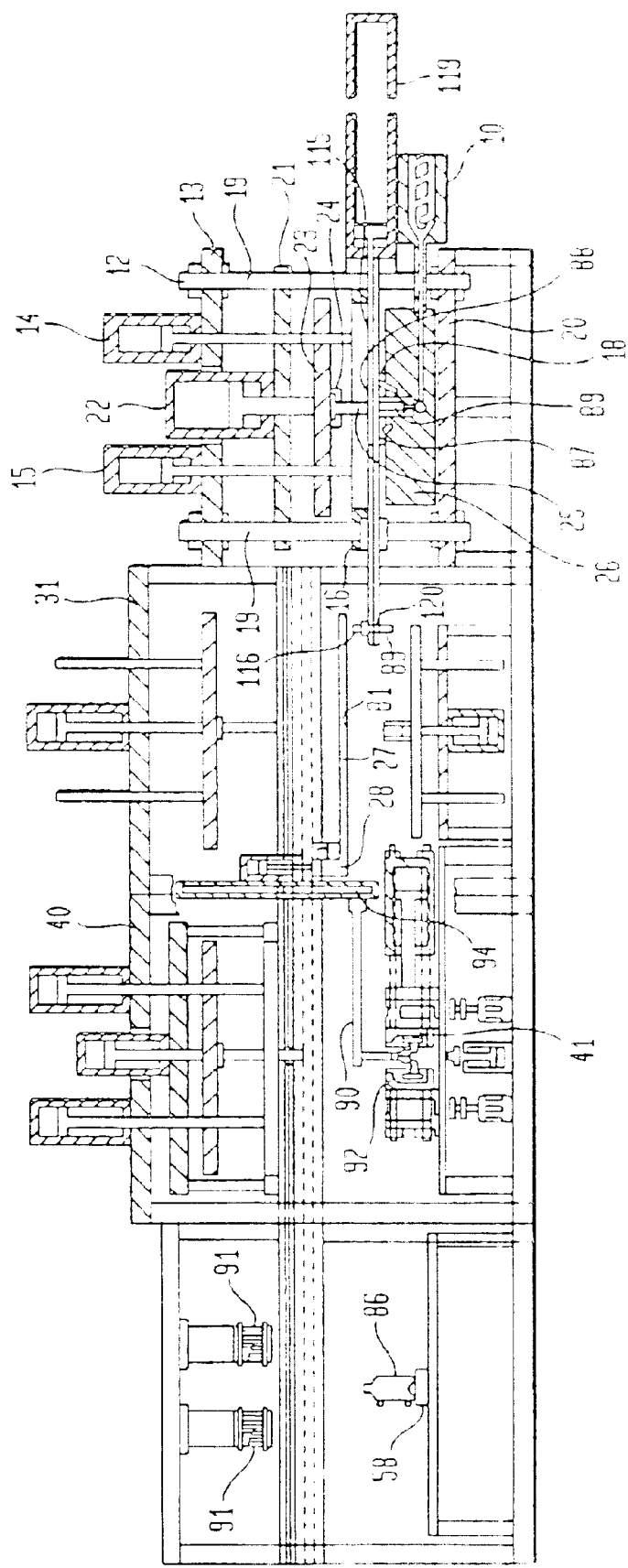
FIG. 1 is a side view of a stretch blow molding apparatus showing from right to left a plasticizer, a preform molding unit with a tray unit, a conditioning unit, a robot with freely programmable universal gripper assembly in a waiting position, a component-transfer device assembly, a stretch blow mold unit, an oriented discharge unit beneath front and back component dispensing cartridges.

With reference now more particularly to the drawings, FIG. 1 is a side view of a stretch blow molding method and apparatus, showing from right to left a plasticizer 10, a preform-molding unit 12 with a preform-mold-cavity assembly 26 in a closed position mounted on a base frame 20, wherein the neck splits 18 remain in sliding connection 87 with the preform-mold-cavity assembly 26 upon raising the frame-type platen 16 holding the ejector bar 88 by the vertical clamp cylinders 14 and 15. Tie bars 19 connect the base platen 20 with the upper clamp platen 13. A movable intermediary clamp-platen housing 21 is connected to the frame-type clamp platen 16. A central clamp cylinder 22 is mounted onto the intermediary clamp-platen housing 21, which moves the injection core-holding platen 23 with the injection-core-mounting bar 24 and injection cores 25. During the opening movement of the frame-type clamp platen 16, a tray unit 115 with at least one row of tray plates 116 through the tray unit moving means 119 starts entering the opening clamp area. As the central clamp cylinder 22 moves the injection cores 25 upwards beyond the ejector bar 88, the tray unit 115 collects the freeing molded preforms 89 in the openings 120 of the tray plate 116 and transfers them to a conditioning unit 31. A universal gripper assembly 27, mounted onto a robot 28 picks up the conditioned preforms 89 and guides them from there into a stretch blow-molding unit 40 to form the hollow articles 86 which are subsequently released in an oriented discharge unit 58, and returns to a waiting position 81 at the tray unit 115.

A following transfer component device assembly 90, which has picked up external components 92 from front and back component dispensing cartridges 91 during a previous stretch blow molding phase, places the same external components 92 into the open blow molds 41 in its component release position 94 during the waiting phase of the universal gripper assembly 27.

Figure 2:
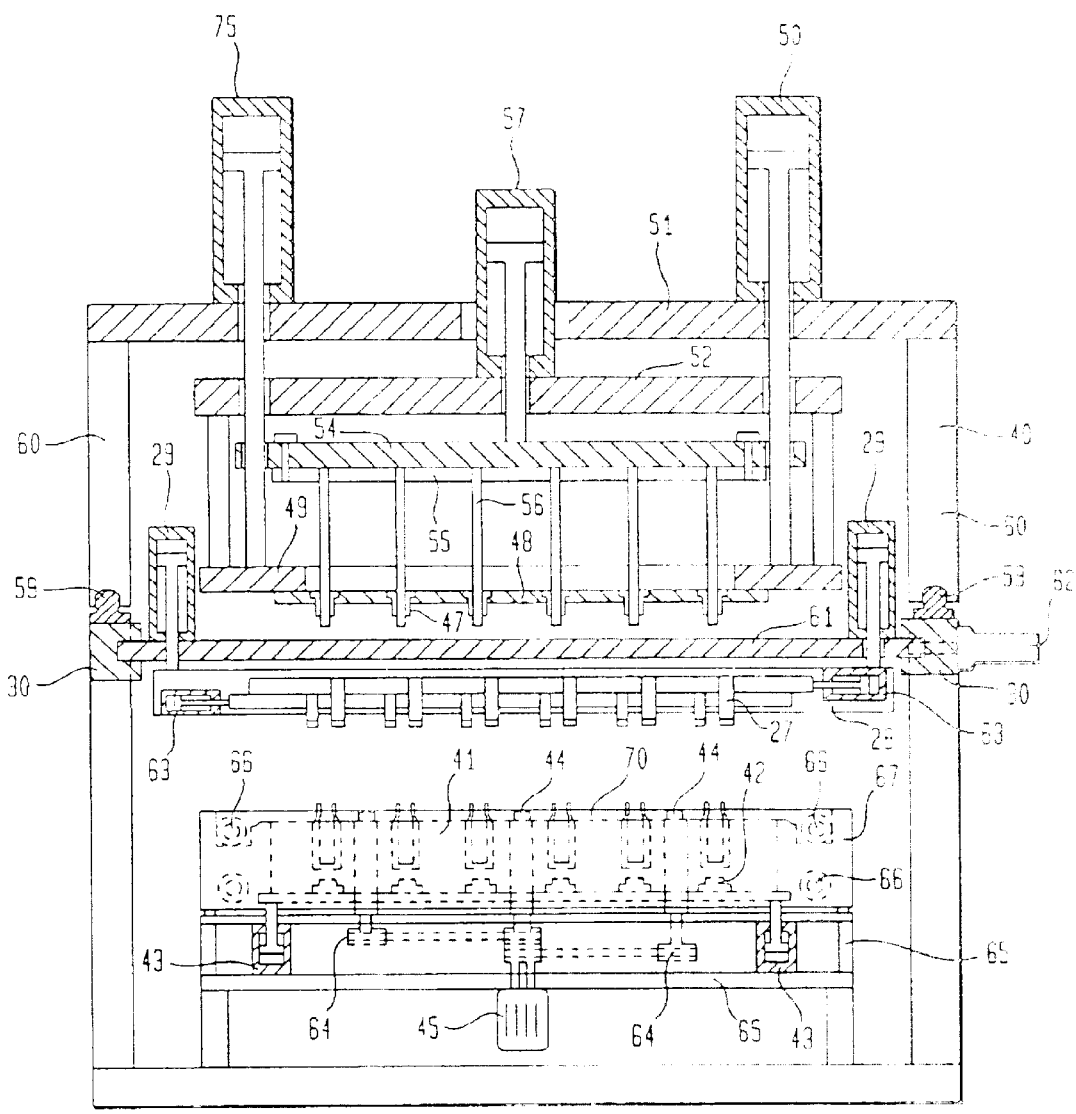
FIG. 2 is a front view of a stretch blow molding unit with clamp cylinders, a stretch rod assembly, a blow core assembly mounted on linear bearings, a robot with a universal gripper assembly and drive, a blow-mold clamp assembly with pivoting spacing platens and drive means as well as bottom plug moving means.

FIG. 2 shows a front view of a stretch blow molding unit 40, wherein the upper portion 60 with the upper moving-means platen 51 on which are mounted the vertical stretch blow moving means 50 and 75 that drive the blow cores 47 which are mounted on a frame-type platen 49 with blow-core holding bars 48 and intermediary stretch-rod clamp-platen housing 52 having central stretch-rod moving means 57 mounted onto the frame-type blow-core clamp platen 49 holding the stretch rods 56, which are mounted on a stretch-rod holding platen 54 with stretch-rod holding bars 55 which ride on linear bearings 59 enabling the upper portion to slide out of its operating position to facilitate the mold change-over procedure. A track rail 30 guides a traversing beam 61, which is monitored by a drive 62. Traversing beam 61 carries robot 28 with the vertical gripper moving means 29 and the gripper opening and closing means 63 of the universal gripper assembly 27. A stack-blow mold assembly 41 is located beneath the upper portion 60 of the stretch blow unit 40 mounted between blow mold clamp platens 67 attached to tie bars 66. Pivoting spacing platens 44 monitored by rotating means 45 and drive gears 64 are mounted in between the blow mold-cavity assembly 41, onto a support frame 65 and upper center cross bars 70. Moving means 43 mounted onto a support frame 65 monitors' bottom-plug rows 42.

Figure 3:
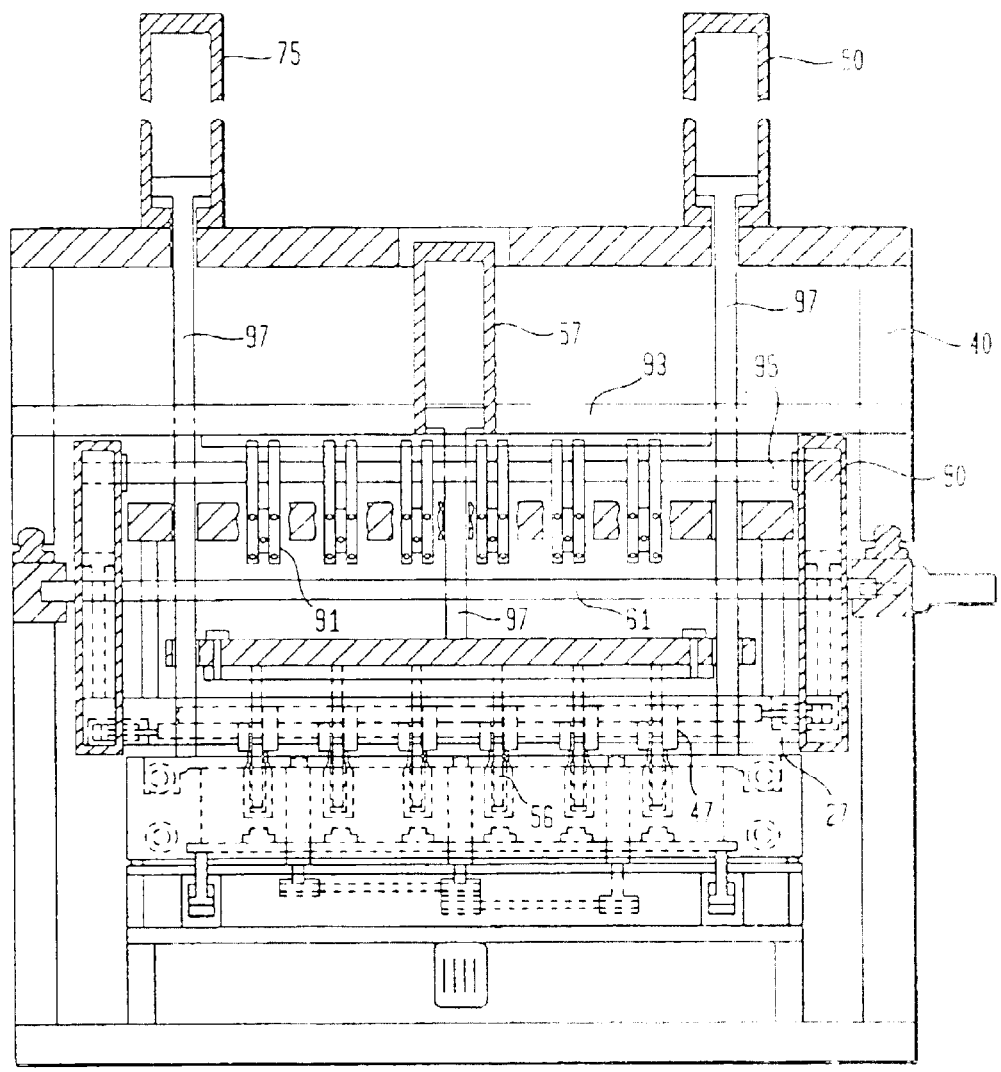
FIG. 3 is a back view of a stretch blow molding unit and component-dispensing assembly showing from top to bottom blow-clamp cylinders, component dispensing cartridges, a robot with the component-transfer device assembly in a component pick-up position, a universal gripper assembly holding the hollow articles in the blow-mold assembly, a pivoting spacing platen with drive means, and a bottom-plug moving means.

FIG. 3 is a back view of a stretch blow mold unit 40 as described in FIG. 2. A frame assembly 93 in front of the stretch blow unit 40 holds the front and back component dispensing cartridges 91. A following transfer component device assembly 90, mounted on a traversing beam 61, is in its component pick-up position 95 while the universal gripper assembly 27, the blow cores 47, and stretch rods 56 are in a stretch blow molding position 97.

FIGS. 4 to 11 show a schematic sequence of a robot 28 with a universal gripper assembly 27 followed by a transfer component device assembly 90 in conjunction with a tray unit 115 and a stretch blow molding sequence.

FIG. 4 shows a schematic side view of a robot 28 with a universal gripper assembly 27 picking up a molded preform 89 and a transfer component device assembly 90 in a stand-by position 98.

FIG. 5 is a schematic top view of a stretch blow molding sequence showing from right to left a plasticizer 10, a preform molding unit 12, a tray unit 115 with a tray plate 116 and openings 120, a conditioning unit 31, a stretch blow molding unit 40, a robot with a universal gripper assembly (not shown), wherein external components 92 are being applied in the closed stretch blow-mold assembly 83 onto finished hollow articles 86 and a finished hollow article discharge unit 58.

FIG. 6 shows a schematic side view of a robot 28 with a universal gripper assembly 27 in a hollow article stretch blow molding position 97 and a finished hollow article 86 with external components 92 applied as well as a transfer component device assembly 90 in an external component pick-up position 95.

FIG. 7 shows a schematic side view of a robot 28 with a universal gripper assembly 27 in a finished hollow article discharge position 80 at a tray plate 116 with opening 120 and a transfer component device assembly 90 in a stand-by position 98 holding external components 92 on the front and back side.

FIG. 8 is a schematic top view of a stretch blow molding sequence showing from right to left a plasticizer 10, a preform molding unit 12 with a tray unit 115, tray plate moving means 119 and tray plate 116, a conditioning unit 31, a stretch blow molding unit 40, wherein in an open stretch blow mold assembly 83 external components 92 are going to be placed by a transfer component device assembly 90 in a component release position 94 and a universal gripper assembly 27 mounted on a robot 28 in a gripper waiting position 81 and a finished hollow article discharge unit 58.

FIG. 9 shows a schematic side view of a robot 28 with a universal gripper assembly 27 in a waiting position 81 and a transfer component device assembly 90 holding on the front and back side external components 92 in a component release position 94.

FIG. 10 is a schematic top view of a stretch blow molding sequence showing from right to left a plasticizer 10, a preform molding unit 12, a tray unit 115 in a discharge position, a conditioning unit 31, a stretch blow molding unit 40, wherein in the open stretch blow mold assembly 83 external components 92 had been placed during the gripper-waiting phase, and a universal gripper assembly 27 mounted on a robot 28 holds molded preforms 89 placed between the closing stretch blow mold assembly 83 in a stretch blow molding position 97 while a transfer component device assembly 90 located above the oriented discharge unit 58 picks up external components 92 from the front and back component dispensing cartridges 91 in its component pick-up position 95.

FIG. 11 shows a schematic side view of a robot 28 with a universal gripper assembly 27 ready to pick up preforms 89 from a tray plate 116 and a component transfer device assembly 90 in a component stand-by position 98 holding front and back components 92.

Figure 12:
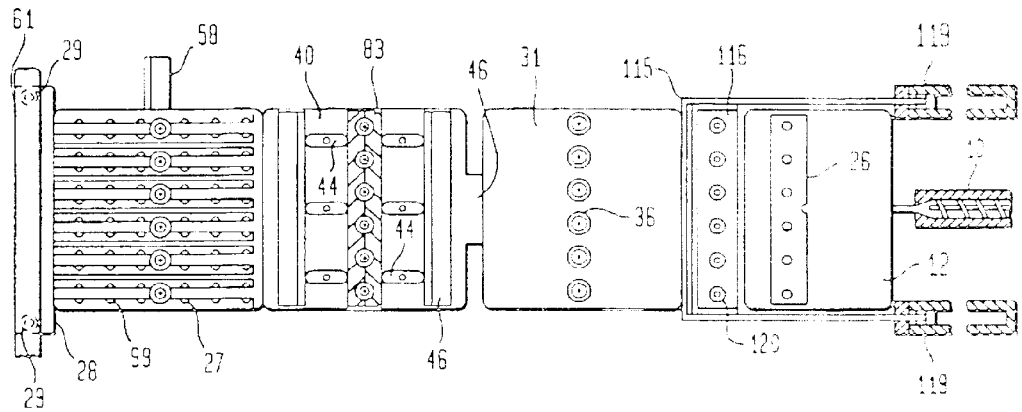
FIG. 12 is a top view of a single-row stretch blow molding apparatus showing from right to left a plasticizer, a preform-molding unit with a tray unit, a conditioning unit, a stretch blow unit and stack blow mold clamp assembly with pivoting spacing platens, and an oriented discharge unit with a universal gripper assembly.

FIG. 12 is a top view of a single-row stretch blow mold apparatus showing from right to left: a plasticizer 10, a preform mold cavity assembly 26, in a preform molding unit 12 with a tray unit 115, a set of heat pots 36 in a conditioning unit 31, a single-row blow-mold assembly 83 with pivoting spacing platens 44 and a stack blow-mold clamp moving means 46 in a stretch blow molding unit 40, positioned in line to a traversing robot 28 with a universal gripper assembly 27 mounted onto a traversing beam 61 and its vertical upper moving means 29 also attached to a traversing beam 61 releasing finished hollow articles onto a lateral oriented discharge unit 58. A multitude of cut-outs in the gripper arms 99 at a multitude of mold cavity center distances allow transfer of preforms and hollow articles with different neck finish sizes at predetermined center distances.

Figure 13:
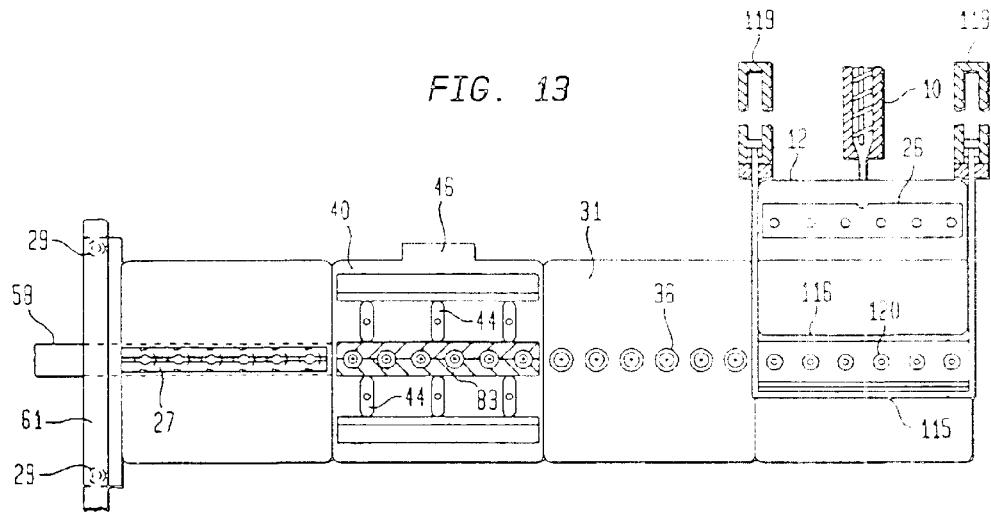
FIG. 13 is a top view of a single-row stretch blow mold apparatus, as shown in FIG. 12, in which the plasticizer, preform-molding unit with tray unit, conditioning unit, stretch blow unit, and oriented discharge unit have been turned to minimize the number of universal gripper assemblies mounted onto the robot.

FIG. 13 is a top view of a single-row stretch blow mold apparatus as shown in FIG. 12 in which the plasticizer 10, the preform mold unit 12 with a preform-mold-cavity assembly 26 and the tray unit 115, the conditioning unit 31 with a set of heat pots 36, the stretch blow molding unit 40 with a single-row blow mold assembly 83 with pivoting spacing platens 44, have been turned perpendicular to a traversing robot 28 with a single-row universal gripper assembly 27 and vertical moving means 29, located on the traversing beam 61, releasing finished hollow articles onto an in-line oriented discharge unit.

Figure 14:
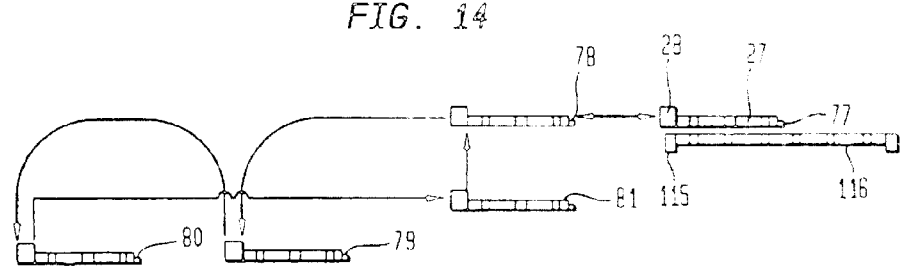
FIG. 14 shows a schematic movement of a universal gripper assembly as from right to left starting at a take-out position of a preform molding unit at the tray plate of a tray unit, traversing to a conditioning unit, descending onto a stretch blow unit, retracting to an oriented discharge unit, returning to a waiting position, and ascending back to the tray unit at a preform molding unit.

FIG. 14 shows a schematic movement of a traversing robot 28 with a universal gripper assembly 27 for a stretch blow molding method and apparatus, starting from right to left at a molded-preform take-out position 77 at the tray plate 116 of a tray unit 115, traversing to a preform-conditioning position 78, descending onto a preform-stretch blow molding position 79 where the preforms are stretch blown into hollow articles, retracting to a finished hollow article oriented discharge position 80, returning to a gripper-waiting position 81, and ascending back towards a preform-pick-up position 82.

FIG. 15 is a top view of a single-row stretch blow molding apparatus as described in FIG. 12 except between the preform mold unit 12 with its preform mold cavity assembly 26 and the conditioning unit 31 is installed a preform reheat unit 100. The universal gripper assembly 27 has been pivoted into a preform take-out position 77 by gripper rotating means 101, connected to the robot 28 to pick up reheated preforms 89 to be transferred through the conditioning unit 31, the stretch blow mold unit 40 where they are transformed into hollow articles and released into the oriented discharge unit 58.

FIG. 16 shows a schematic sequence from right to left of a robot 28 with a universal gripper assembly 27 pivoted by the gripper rotating means 101 into a preform take-out position 77, then being returned by same gripper rotating means 101 into a basic traversing mode to enter a preform conditioning position 78 descending onto a preform stretch blow molding position 79, where the preforms are being stretch blown into hollow articles, retracting to a finished hollow article oriented discharge position 80, returning to a universal gripper preform pick-up position 82 or tray plate 116.

Figure 17:
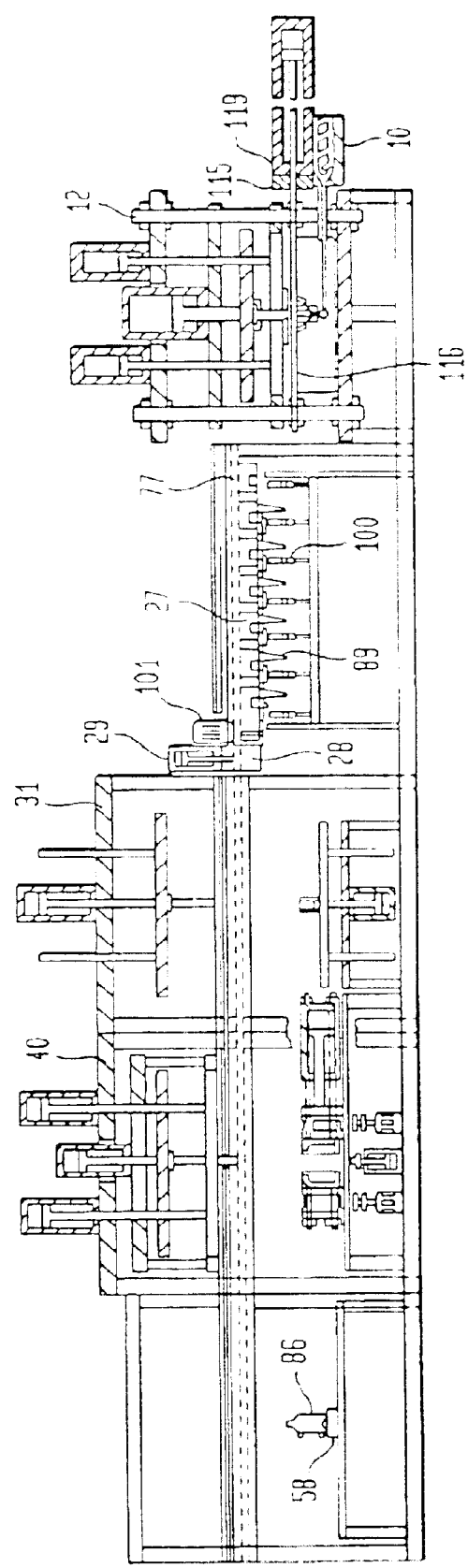
FIG. 17 is a side view of a single-row stretch blow molding apparatus showing from right to left a plasticizer, a preform molding unit with a tray unit in a retracted position, a robot with a universal gripper assembly in a pivoted position, a reheat unit behind, a conditioning unit, a stretch blow unit, and an oriented discharge unit.

FIG. 17 is a side view of a single-row stretch blow molding apparatus as described in FIG. 1 with a plasticizer 10 and a preform molding unit 12 with a tray unit 115 in a retracted position. A robot 28 with gripper moving means 29 is equipped with gripper rotating means 101 that pivot a universal gripper assembly 27 into a preform take-out position 77 to pick up preforms 89 from a lateral preform reheat unit 100 and returns to its basic position to guide the preforms through a conditioning unit 31 and a stretch blow unit 40 to be stretch blown into hollow articles 86 which are released in an oriented discharge unit 58.

Figure 18:
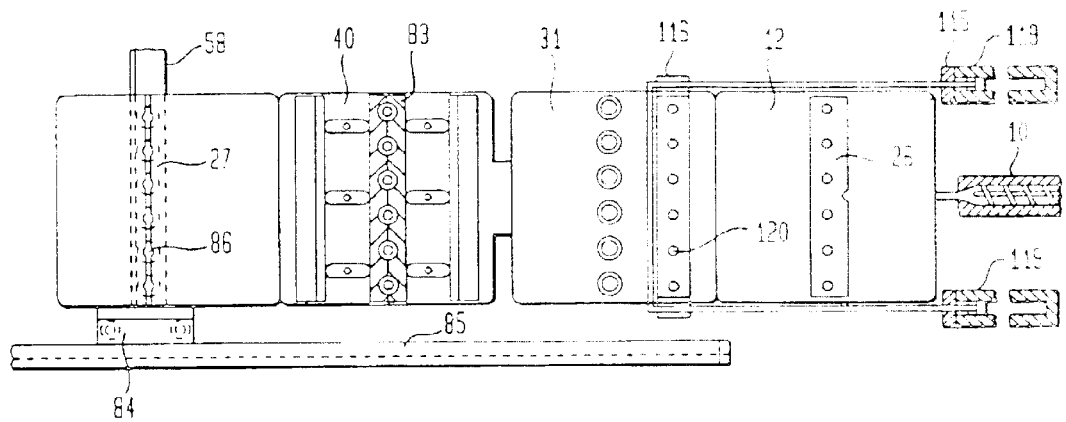
FIG. 18 is a top view of a single-row stretch blow molding apparatus as shown in FIG. 12, wherein a robot together with the universal gripper assembly indexes along a lateral guide rail.

FIG. 18 is a top view of a single-row stretch blow molding apparatus as shown in FIG. 12, wherein a gantry robot 84 indexes together with a universal gripper assembly 27 along a lateral guide rail 85 to pick up molded preforms from a tray plate 116 with openings 120 of a tray unit 115 with moving means 119 collected from a preform-mold-cavity assembly 26 in the preform-molding unit 12, and transfers the same into a conditioning unit 31, descends into a single-row blow mold cavity assembly 83 in a stretch blow molding unit 40, where preforms are stretch blown into hollow articles, and retracts into an oriented discharge unit 58 to release finished hollow articles 86.

Figure 19:
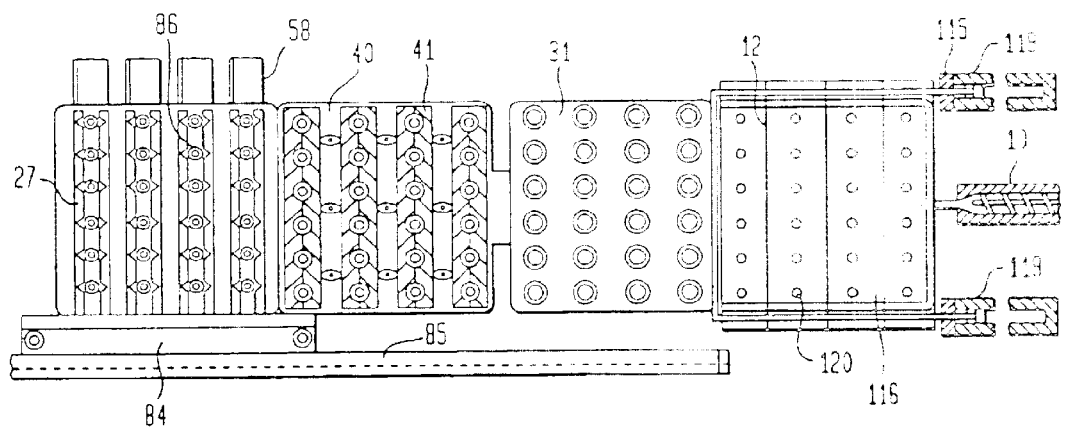
FIG. 19 is a top view of a multi-row stretch blow molding apparatus wherein a robot together with a universal gripper assembly indexes along a lateral guide rail.

FIG. 19 is a top view of a multi-row stretch blow molding apparatus wherein a robot 84 indexes sideways together with a universal gripper assembly 27 along a lateral guide rail 85 to pick up molded preforms from a tray unit 115 with a multi-row of tray plates 116 collected from an opening preform mold cavity assembly 26 in a preform molding unit 12, indexes the same into a conditioning unit 31, descends into a multi-row stack-blow mold cavity assembly 41 in a stretch blow molding unit 40, wherein the preforms are stretch blown into hollow articles, and retracts into an oriented discharge unit 58 to release the finished hollow articles 86.

Figure 20:
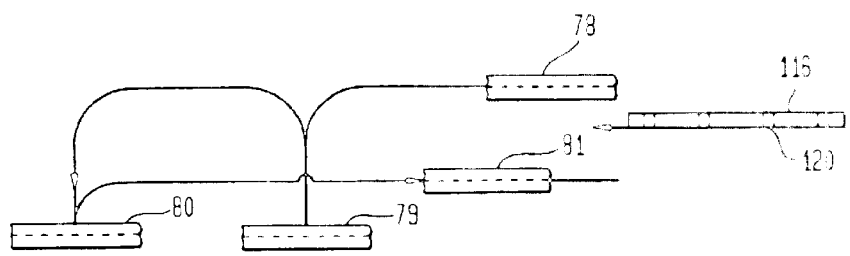
FIG. 20 shows a back view of a schematic movement of a laterally indexing robot with a universal gripper assembly from right to left, starting at a take-out position of a tray unit in the preform-molding unit, ready to move into a conditioning unit from where the robot descends, onto a stretch blow unit, retracts to an oriented discharge unit, returns and ascends back into the conditioning unit waiting for the tray unit to supply molten preforms from the preform-molding unit.

FIG. 20 shows a back view of a schematic movement of a laterally indexing robot 84 indexing sideways with a universal gripper assembly 27 starting from right to left, at a preform-take-out position 77 at a tray plate 116 with openings 120, indexing to a preform-conditioning position 78, descending onto a preform-stretch blow-molding position 79, where the preforms are stretch blown into hollow articles, retracting to a finished-hollow-article-discharge position 80, returning to a gripper-waiting position 81, and ascending back towards a preform-pick-up position at the tray plate 116.

Figure 21:
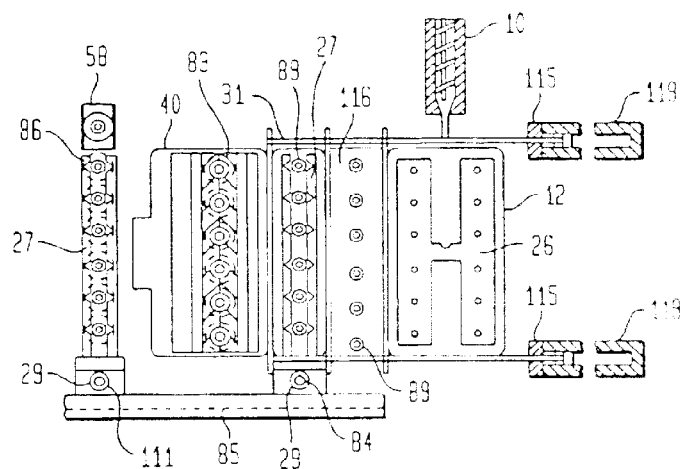
FIG. 21 shows the top view of a one and a half step stretch blow molding assembly consisting of a plasticizer, a preform molding unit with a double row preform mold and a tray unit, a primary gantry robot with a universal gripper assembly, a single row stretch blow unit and a secondary gantry robot with a universal gripper assembly and a discharge unit beneath.
Figure 22:
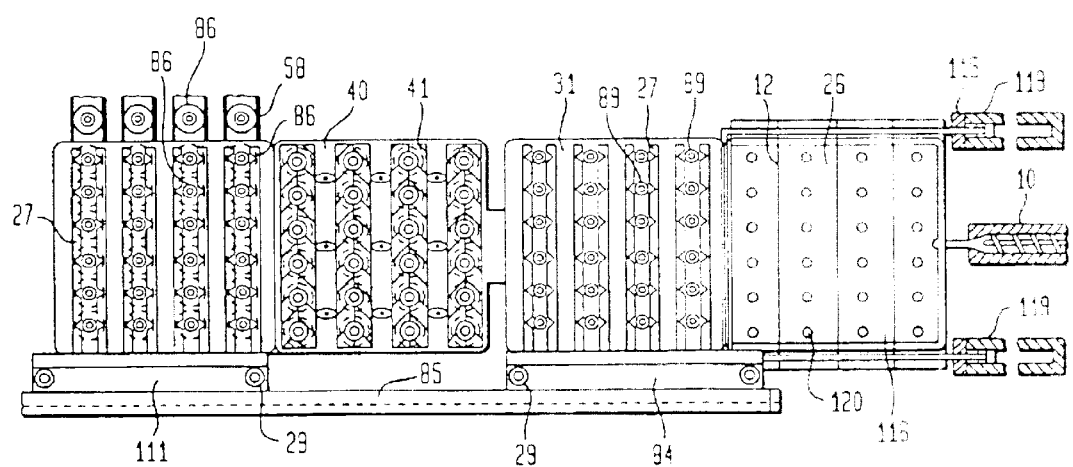
FIG. 22 shows the top view of a one-step stretch blow molding assembly consisting of a plasticizer, a preform molding unit with a multi-row tray unit, a conditioning unit, a primary gantry robot with a multi-row universal gripper assembly, a stack blow mold unit, a secondary gantry robot with a multi-row universal gripper assembly FIG. 23 show the top view of a tray unit in a preform molding unit with tray plates telescoped into an extended row preform discharge position.
Figure 27:
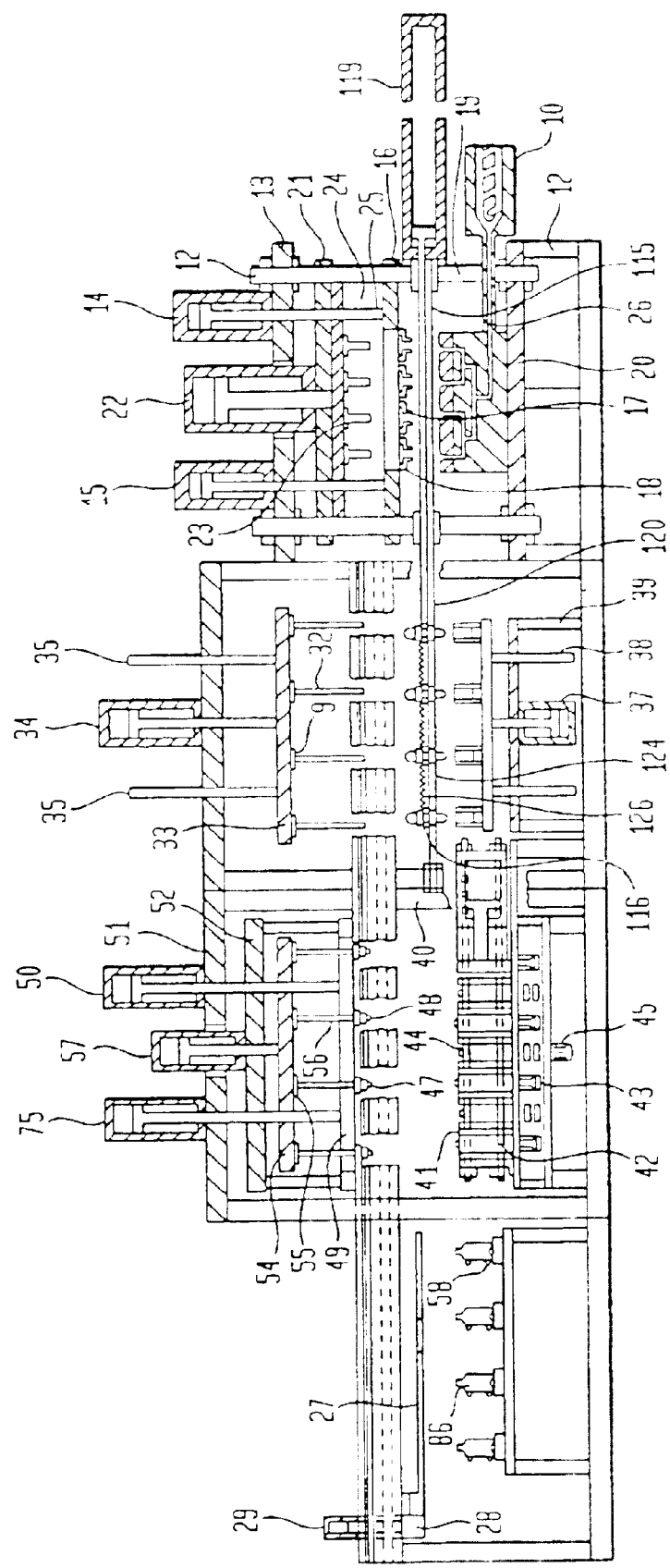
FIG. 27 is a side view of a multi-row stretch blow molding apparatus showing from right to left a plasticizer, a preform-molding unit with a tray unit in a telescoped position holding preforms by their transfer beads, a conditioning unit, a stretch blow unit, an oriented discharge unit, and a robot with universal gripper assembly.

FIG. 21 shows the top view of a one and a half step stretch blow molding assembly consisting of a plasticizer 10, a preform molding unit 12 with a double row preform mold 26 and a tray unit 115 with the moving means 119 having the two rows of tray plates 116 with collected preforms 89 shifted outside the preform molding unit 12 into the conditioning unit 31. A primary gantry robot 84 with gripper moving means 29 and universal gripper assembly 27 picks up conditioned preforms 89 from one row of the tray plates 116 transfers the same on a lateral guide rail 85 into the single row stretch blow mold assembly 83 of the stretch blow molding unit 40 and returns to a subsequent row of tray plates 116 ready to pick up the next fraction of molten preforms 89 while a secondary gantry robot 111 mounted onto the lateral guide rail 85 picks up finished hollow articles 86 from the stretch blow unit 40 and releases the same into the oriented discharge unit 58;

FIG. 22 shows the top view of a one-step stretch blow molding assembly consisting of a plasticizer 10, a preform molding unit 12 with a multi-row tray unit 115 in a retracted position, its moving means 119, the tray pates 116 and tray plate openings 120, a conditioning unit 31 and a primary gantry robot 84, mounted onto the lateral guide rail 85 with a universal gripper assembly 27 holding molten preforms 89, a stack blow mold unit 40 with a multi-row stack blow mold assembly 41 and a secondary gantry robot 111 mounted onto a lateral guide rail 85 releasing finished hollow articles 86 onto an oriented discharge unit 58;

FIG. 23 shows the top view of a tray unit 115 mounted onto the tiebars 19 of a preform molding unit (not shown) extended into a discharge position whereby the moving means 119 have shifted the tray plates 116 with collected molten preforms 89 on linear rails 118 mounted onto the tray unit base 121 through telescoping means 126 and telescoping bushings 125 to align with the center row distances of the down stream units (not shown);

FIG. 24 shows the top view of a tray unit 115 mounted onto the tiebars 19 of a preform molding unit (not shown) in a retracted position whereby the moving means 119 have shifted the tray plates 116 together into the preform molding unit (not shown) to collect molten preforms in their openings 120;

FIG. 25 shows the front view of a tray unit 116 holding molten preforms with transfer beads 124 in the openings 120 of the tray plate 116. The tray plate 116 sits on linear bearings 117 sliding on linear rails 118 attached to the tray unit base 121, mounted onto the tiebars 19 of the preform molding unit (not shown) through telescoping means 126 and telescoping bushings 125;

FIG. 26 shows the front view of a tray plate 116 with catch baskets 123 holding molten preforms without transfer beads 122 in the openings 120;

FIG. 27 is a side view of a multi-row stretch blow molding method and apparatus showing from right to left a plasticizer 10, a preform-molding unit 12 consisting of an upper clamp platen 13 with vertical clamp cylinders 14 and 15 connected to a frame-type clamp platen 16 holding the neck split mounting bars 17 and neck splits 18. The frame-type clamp platen 16 slides up and down on tie bars 19 which are connected to the base platen 20 and the upper clamp platen 13. An intermediary clamp platen housing 21 is connected to the frame-type clamp platen 16. A central clamp cylinder 22 is mounted onto the intermediary clamp platen housing 21 which moves the injection core holding platen 23 with the injection core mounting bars 24 and injection cores 25. A preform mold cavity assembly 26 with narrow center row distances is mounted onto the base frame 20. The preform-molding cycle starts when the frame-type clamp platen 16 with the neck-split mounting bars 17 and neck splits 18 have been lowered onto the mold cavity assembly 26 by the vertical clamp cylinders 14 and 15, and the injection cores 25 have entered the preform mold cavity assembly 26.

Figure 28:
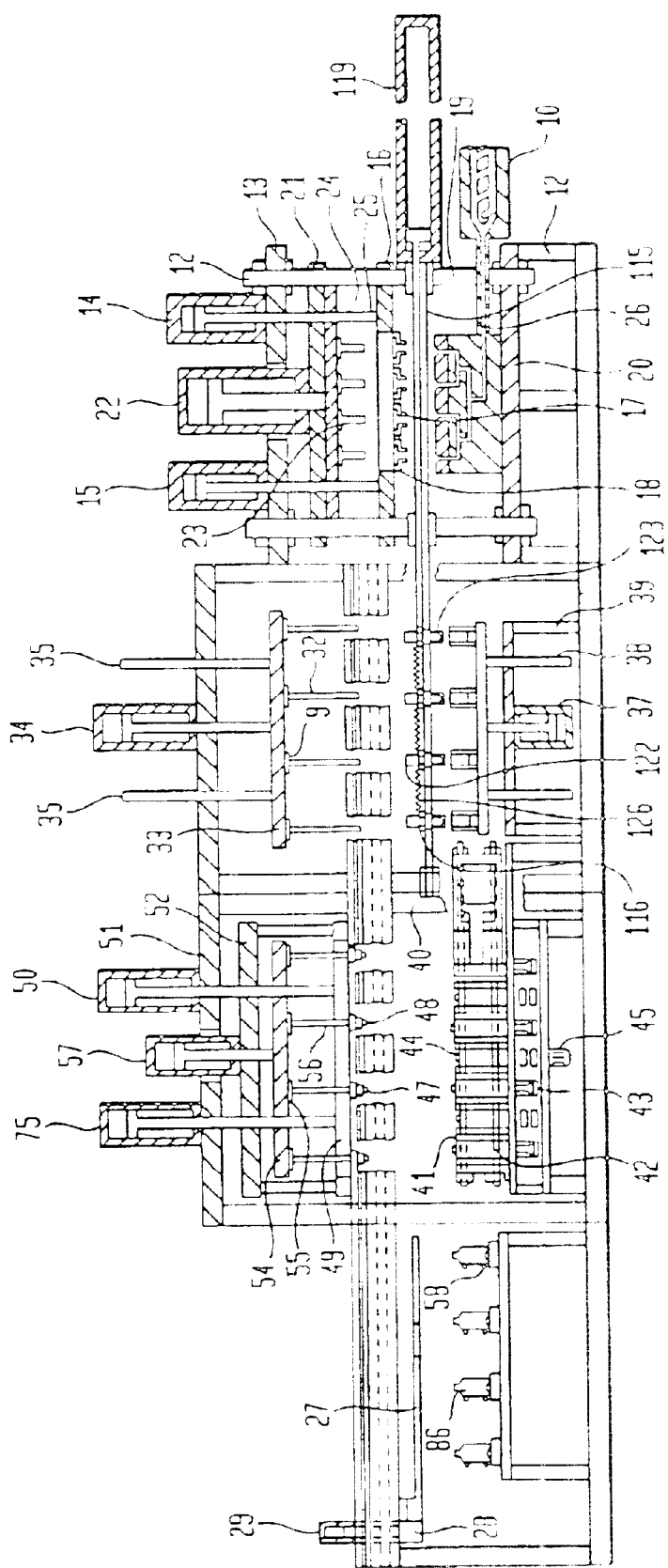
FIG. 28 is a side view of a multi-row stretch blow molding apparatus showing from right to left a plasticizer, a preform-molding unit with a tray unit and catch baskets in a telescoped position holding preforms without transfer beads, a conditioning unit, a stretch blow unit, an oriented discharge unit, and a robot with universal gripper assembly.
Figure 29:
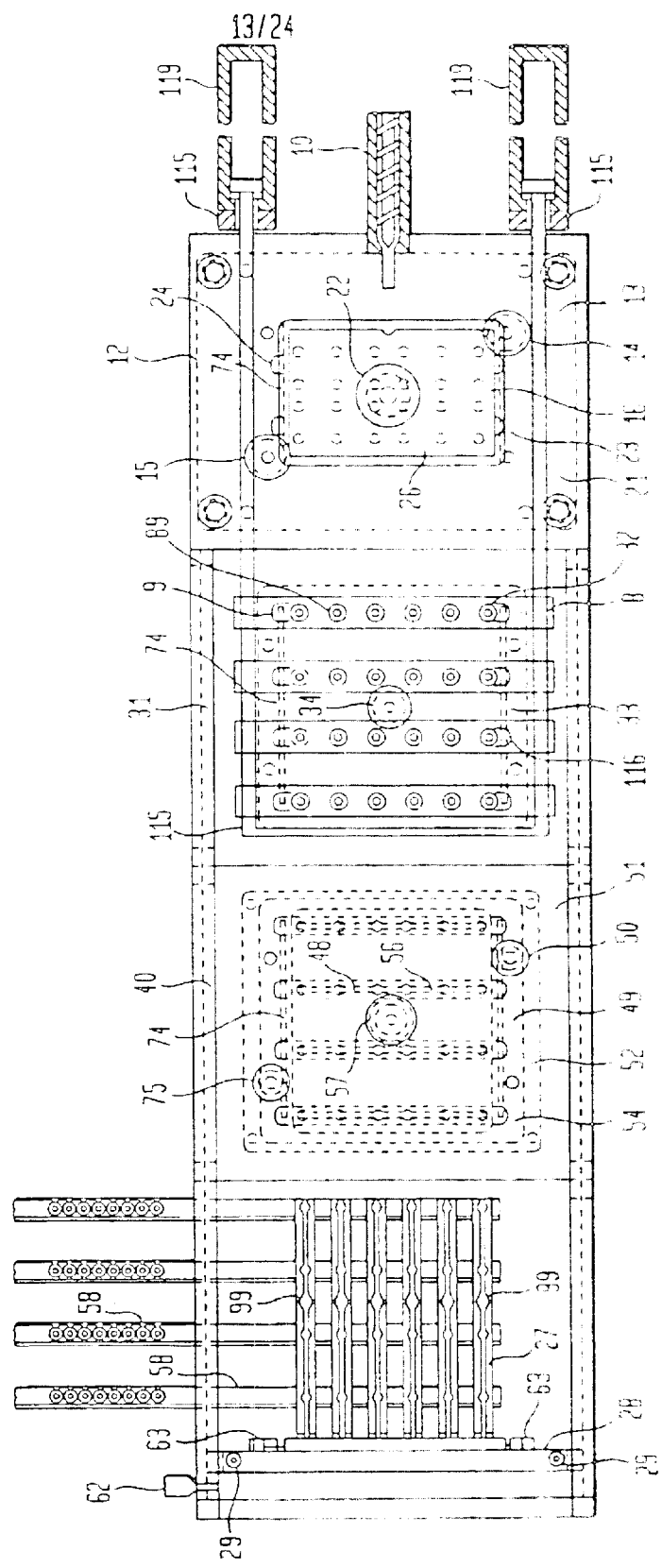
FIG. 29 is a top view of a multi-row stretch blow molding apparatus showing from right to left a plasticizer, a preform molding unit with a preform mold assembly and a tray unit with tray plates in a telescoped preform discharge position, a conditioning rod-holding platen and rows of conditioning rod-holding bars mounted beneath (not shown), a stretch-rod holding platen, and rows of blow-core holding bars mounted onto a frame-type clamp platen beneath, an oriented discharge unit beneath a robot with a universal gripper assembly, and a drive mounted onto a traversing beam rail frame of the robot.
Figure 30:
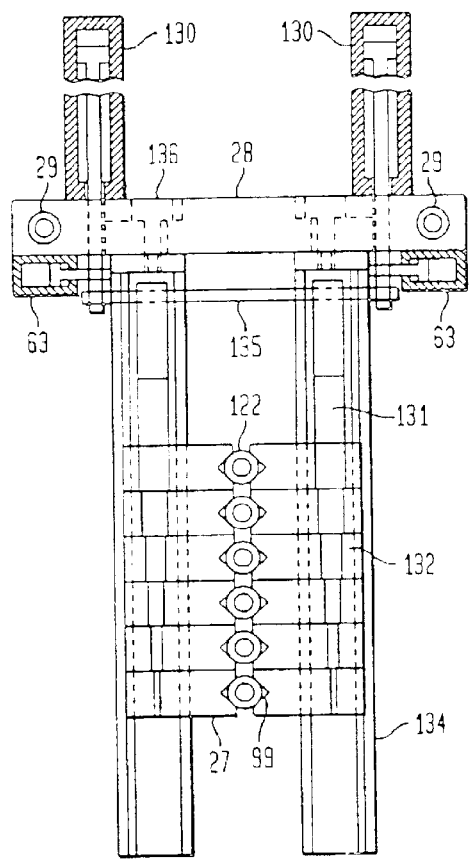
FIG. 30 shows the top view of a robot with a telescoping universal gripper assembly in a retracted preform pick up position.
Figure 31:
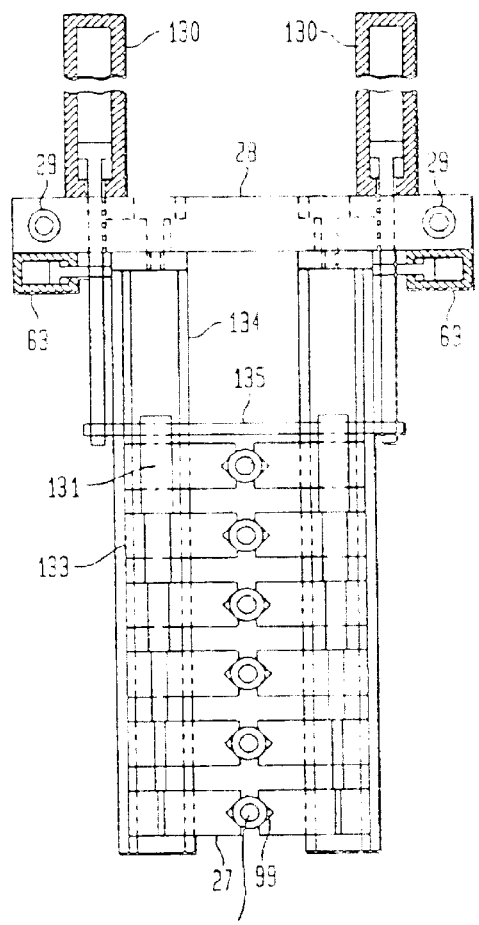
FIG. 31 shows the top view of a robot with a telescoping universal gripper assembly in an extended preform placing position.
Figure 32:
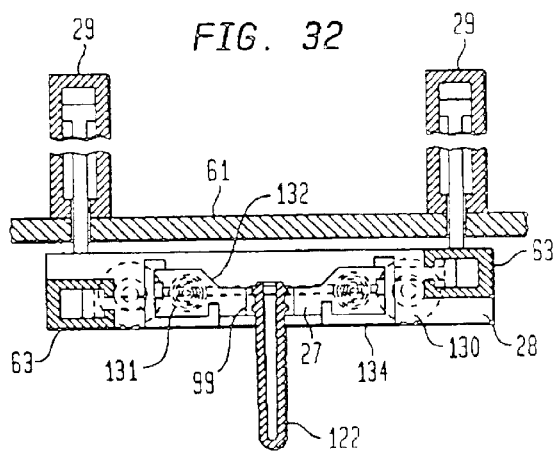
FIG. 32 shows the front view of a robot with a telescoping universal gripper assembly, holding a preform.
Figure 33:
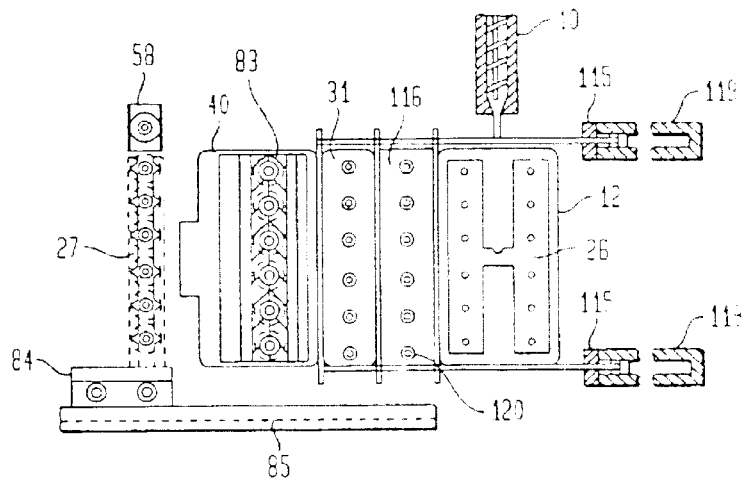
FIG. 33 shows the top view of a one and a half step stretch blow molding assembly with a plasticizer, a preform molding unit with a two row preform mold and two row tray unit above a conditioning unit, a single row blow mold unit and a gantry robot with a universal gripper assembly at a discharge unit.
Figure 34:
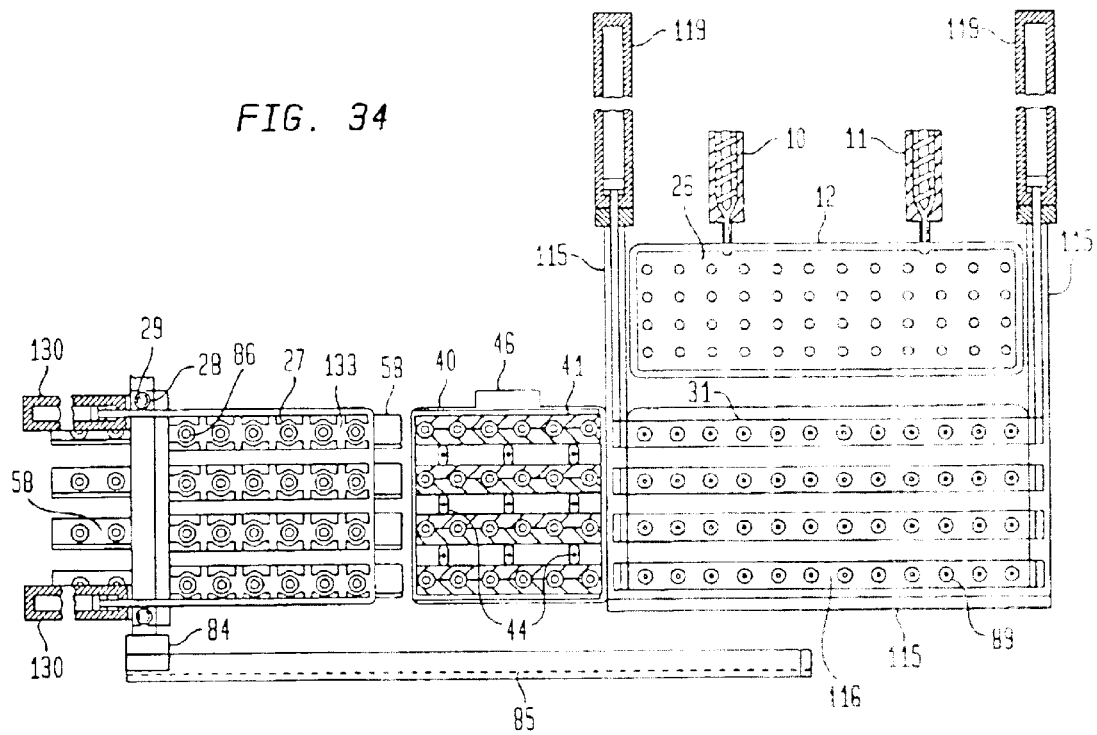
FIG. 34 shows the top view of a multi row one and a half step stretch blow molding assembly with two plasticizers, a preform molding unit with a multi row preform mold and a multi row tray unit, a conditioning unit beneath, a stack blow mold unit, a gantry robot with-a telescoping universal gripper assembly and an oriented discharge unit beneath.
Figure 37:
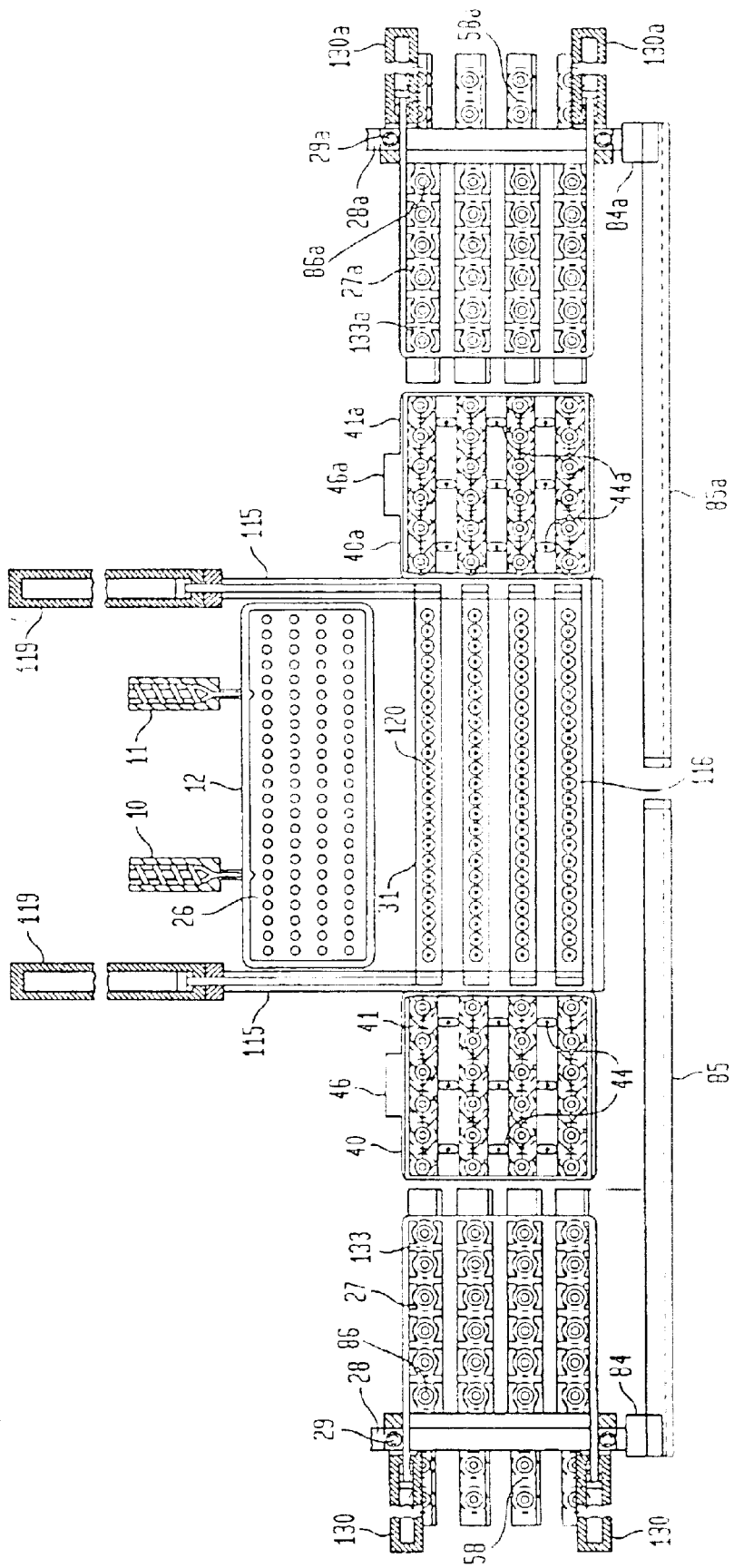
FIG. 37 shows the top view of a multi row one and a half step stretch blow molding assembly with two plasticizers, a preform molding unit with a multi row preform mold and a multi row tray unit, a conditioning unit beneath, a multitude of stack blow mold units, a multitude of gantry robots with telescoping universal gripper assemblies and oriented discharge units beneath.
Figure 38:
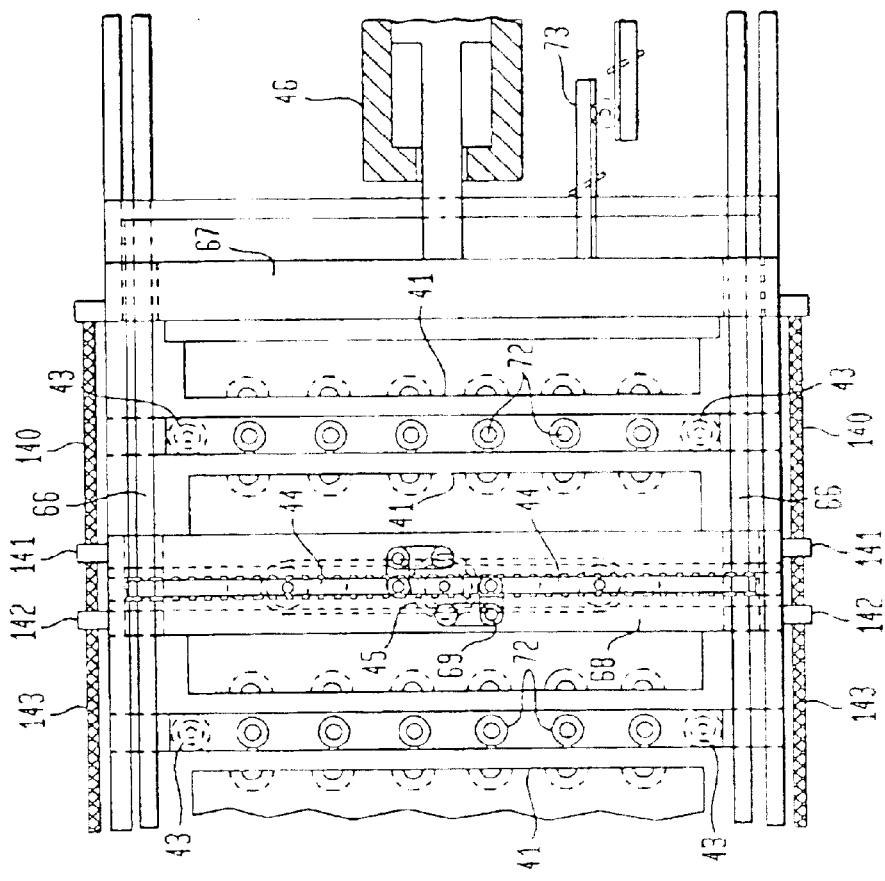
FIG. 38 is a top view of a stack-blow mold assembly section in a closed position with the spacing platen assembly in an extended position.
Figure 39:
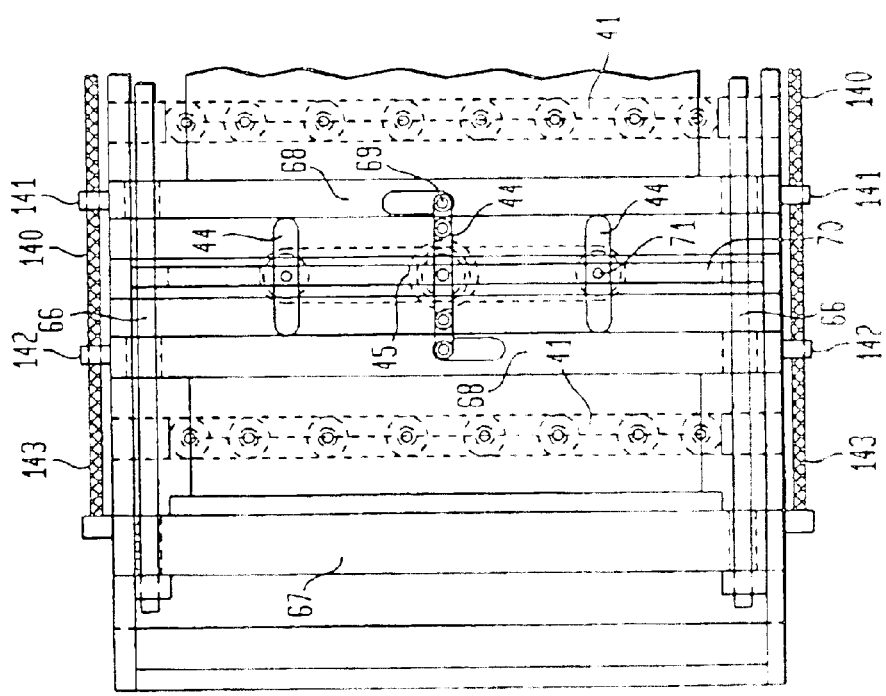
FIG. 39 is a top view of a stack blow mold assembly section in an open position with the spacing platens assembly in a retracted position showing the rows of bottom plugs, a clamp moving means, and a clamp-platens synchronizing gear mechanism.

Upon completion of the preform-molding phase, both the frame-type platen 16 and the intermediary clamp platen housing 21 are raised together by the vertical clamp cylinders 14 and 15. A tray unit 115 is mounted onto the tiebars 19 of the preform molding unit 12 holding molten preforms with transfer beads 124 in a telescoped center row discharge position corresponding to the center row distances of the downstream units. A universal gripper assembly 27, mounted onto a robot 28 with a vertical moving means 29, slides on track rails 30 above the tray plates 116 of the tray unit 115 to lift the molten preforms 124 out of the tray plate openings 120 and guides them to the conditioning unit 31. The preform-mold cavity assembly 26 is closed again to mold a new set of preforms. The conditioning rods 32 held by individual mounting bars 9 and mounted upon the base plate 33, connected to a central conditioning rod clamp cylinder 34 and guide rods 35, descend into the preforms (not shown). A set of heat pots 36 are raised around the preforms (not shown) by central raising means 37 and aligned by guide rods 38 mounted on a base unit 39. Upon completion of the conditioning phase, the conditioning rods 32 and the heat pots 36 retract. The universal gripper assembly 27 indexes the preforms into the stretch blow-molding unit 40 and lowers them into stretch blow molds 41 with the gripper moving means 29. Bottom plugs 42 are raised by bottom plug moving means 43. Rotating means 45 pivot spacing platens 44 to close the blow-mold halves 41. The blow-mold clamp assembly 46 with synchronizer (not shown) generates the final clamp closing pressure. Simultaneously, blow cores 47 held by blow core holding bars 48, mounted onto a frame-type blow-core clamp platen 49, are lowered onto the preforms (not shown), held in the closed blow-mold cavities 41 by vertical moving means 50 and 75, mounted onto the upper moving means platen 51. Intermediary stretch-rod clamp-platen housing 52, mounted onto the frame-type blow-core clamp platen 49 follows the blow-core movement. Central stretch-rod moving means 57, mounted onto the intermediary stretch-rod clamp-platen housing 52, connected to the stretch-rod holding platen 54, with the stretch-rod mounting bars 55 holding stretch rods 56 and moves stretch rods 56 into the preforms (not shown). Upon completion of the stretch blow phase, vertical stretch blow moving means 50 and 75 as well as stretch-rod moving means 57 retract to their upper positions, the universal gripper assembly 27 is raised by the gripper moving means 29 and retracts the finished hollow articles 86 to an oriented discharge unit 58 before returning to the waiting position at the tray unit 115;

FIG. 28 shows the same side view of a multi-row stretch blow molding apparatus as described in FIG. 27 except beneath the tray plates 116 are mounted catch baskets 123 to carry collected molten preforms without tranfer beads 122;

FIG. 29 shows a top view of a stretch blow molding method and apparatus consisting of plasticizer 10, preform molding unit 12, tray unit 115 with telescoping rod moving means 119 to align the tray plates 116 with collected molten preforms 89 from the narrow center row distances of the preform mold cavity assembly 26 to the center row distances of the down stream units, the conditioning unit 31, the stretch blow molding unit 40, all equipped with upper moving-means platens 13, 8, and 51 holding vertical clamping means 14, 15, 34, 50, and 75, respectively. Beneath are located the intermediary clamp platen housings 21 and 52 holding central clamp cylinders 22 and 57. Central clamp cylinders 22, 34, and 57 are connected to holding platens 23, 33, and 54, respectively, under which are held in place on individual mounting bars 24, 9, and 55 the injection cores 25, the conditioning rods 32, and the stretch rods 56, respectively. Beneath the holding platens 23 and 54 are located the individual mounting bars 17 and 48 to hold the neck splits 18, and blow cores 48 onto frame-type clamp platens 16 and 49, respectively, with elongated mounting holes 74 which permit variations in the center row distances according to the preform mold cavity center distances. Mounting bars 9 for the conditioning rods are bolted in elongated slots 74 onto the holding platen 33. The top view further shows a universal gripper assembly 27 with opening and closing means 63 mounted onto a robot 28 monitored by a drive 62 and gripper moving means 29 and an oriented discharge unit 58 beneath. A multitude of cut-outs in the gripper arms 99 at a multitude of mold cavity center distances allows to transfer preforms and finished hollow articles with different neck finish sizes and predetermined center distances;

FIG. 30 shows the top view of a robot 28 with vertical moving means 29 and a universal gripper assembly 27 consisting of telescoping rod moving means 130 and gripper components 132 retracted by a telescoping rod 131 into a molten preform 122 pick up position. The component support rails 134 are mounted onto the robot 28 with sliding mounting bolts 136 and connected to gripper opening and closing means 63. A push-pull bar 135 connected to the telescoping rod moving means 130 and the telescoping rods 131 provides the retracting movement for the gripper components 132 to pick up molten preforms 122 with the gripper component cutouts 99 from preform molds (not shown) with narrow center distances and the telescoping movement as shown in FIG. 31 to subsequently align the molten preforms 122 to the larger center distances of the blow mold cavities (not shown);

FIG. 31 shows the top view of a robot 28 as described in FIG. 30 except the gripper components 132 are now telescoped into the above described extended position 133 to align the molten preforms 122 to the larger center distances of the blow mold cavities (not shown);

FIG. 32 shows the front view of a robot 28 as described in FIG. 30 with vertical moving means 29 and a universal gripper assembly 27 slidable on the support rails 134 by a telescoping component rod 131 holding a molten preform 122 with the cut-outs 99 of the gripper components 132 and the opening and closing means 63;

FIG. 33 shows the top view of a one and a half step stretch blow molding assembly with a plasticizer 10, a preform molding unit 26 with a two row preform mold 26 and a tray unit 115 with moving means 119 having the extended two rows of tray plates 116 with molten preforms collected in the openings 120 shifted outside the preform molding unit 12 into the conditioning unit 31. A gantry robot 84 with a universal gripper assembly 27 mounted onto a lateral guide rail 85 picks up sequentially fractions of molten preforms from the tray unit 115 and transfers them to the single row blow mold assembly 83 in the stretch blow molding unit 40 and subsequently into the oriented discharge unit 58;

FIG. 34 shows the top view of a multi row one and a half step stretch blow molding assembly with two plasticizers 10 an 11, a preform molding unit 12 with a multi row preform mold 26 and a multi row tray unit 115 having moving means 119 to telescope the tray plates 116 with molten preforms 89 into a conditioning unit 31 so that their center row distances are aligned with those of the stack blow mold assembly 41 in the stretch blow mold unit 40. A gantry robot 84 mounted onto a lateral guide rail 85 with a universal gripper assembly 27 and telescoping gripper components 133 picks up a fraction of molten preforms 89 from the extended tray plates rows 116 guides and holds them in the stack blow mold assembly 41 with the closing means 46 and spacing platens 44 of the blow mold unit 40. Upon completion of the stretch blow cycle the same gantry robot 84 lifts and releases the finished hollow articles 86 onto an oriented discharge unit 58 beneath prior to returning to the tray unit 115 to pick up a next fraction of molten preforms 89; FIG. 35 shows the top view of a one and a half step stretch blow molding assembly as described in FIG. 34 except the conditioning unit 31 is installed adjacent to the preform molding unit 12 and the telescoping tray unit 115 to enable to condition the molten preforms 89 being picked up in fractions by a gantry robot 84 with a telescoping universal gripper assembly 27 from the tray plates 116 at varying time intervals;

FIG. 36 shows the schematic movement of a robot 28 with a universal gripper assembly 27 from right to left at a fractional pick up position of molten preforms (not shown) from a tray plate 116 mounted onto a tray unit base 121, traversing a conditioning unit 78, descending onto a stretch blow molding unit 79, retracting to an oriented discharge unit 80, returning to the tray unit 116 to pick up a subsequent fraction of molten preforms (not shown);

FIG. 37 shows the top view of a multi row one and a half step stretch blow molding assembly as described in detail in FIG. 34 except the assembly is equipped with a second multi row blow mold assembly 41a in a second stack blow mold unit 40a and a second robot 28a with a telescoping universal gripper assembly 27a and second oriented discharge unit 58a to either double the output of hollow articles or produce different hollow articles from the same preforms simultaneously;

FIG. 38 is a top view of a multi-row stack-blow mold cavity assembly 41 in a closed position with pivoting spacing platens 44 in an extended position driven by rotating means 45, accelerated by helical spindles 140 and 143 with helical nuts 141 and 142, wherein the stretch blow mold mounting platens 68 are directly attached and extended by a hinge mechanism 69. Floating center-cross bars 70, attached to blow-mold tie bars 66, serve as center pivot points for the center axes 71 of the pivoting spacing platens 44. Synchronized blow-mold clamp platens 67 mounted onto blow mold tie bars 66 generate the necessary clamp closing force via closing means (not shown);

FIG. 39 shows a top view of a multi-row stack-blow mold cavity assembly 41 in an open position with pivoting spacing platens 44 and hinge mechanism 69 in a retracted position and helical spindles 140 and 143 with helical nuts 141 and 143. Bottom plug rows 72 and bottom-plug-moving means 43 are shown between the open multi-row stack blow mold halves 41. Blow mold clamp means 46, monitored by a clamp platen synchronizer assembly 73, open the outer blow-mold clamp platens 67 attached to blow-mold tie bars 66.

Figure 40:
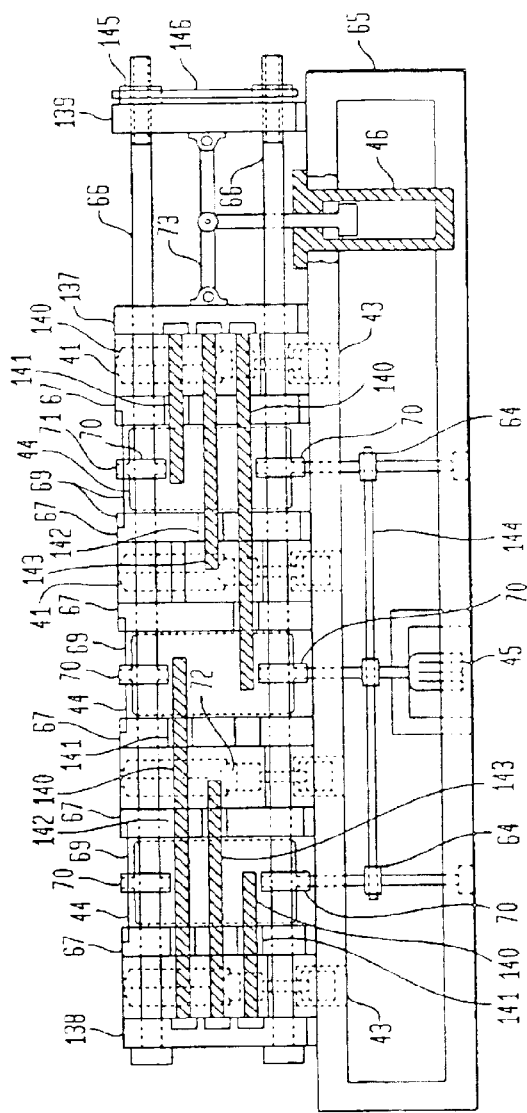
FIG. 40 is the side view of a stack blow mold assembly in a closed position.

FIG. 40 shows a side view of a stack-blow mold cavity assembly 41 mounted on a base frame 65 in a closed position with pivoting spacing platens 44 and hinge mechanism 69 in an extended position driven by rotating means 45 connected to spacing platen rotating gears 64 by an endless drive belt 144, and right turn as well as left turn helical spindles 140 and 143 mounted onto the front and rear blow mold clamp platens 137 and 138 as well as right and left thread helical nuts 141 and 142 mounted onto the intermediary blow mold clamp platens 67, driven by synchronizing moving means 46 and 73 mounted between the rear blow mold clamp platen 137 and the blow mold assembly back platen 139 connected via tie bars 66 to the front blow mold clamp platen 138 and the mold height adjustment nuts 145 toothed belt 146 and electric drive (not shown). Bottom plug rows 72 and bottom plug moving means 43 are shown between the closed multi-row stack blow mold halves 41. Floating center cross bars 70, attached to the blow mold tie bars 66 serve as a center pivot point for the center axes 71 of the spacing platens 44.

Figure 41:
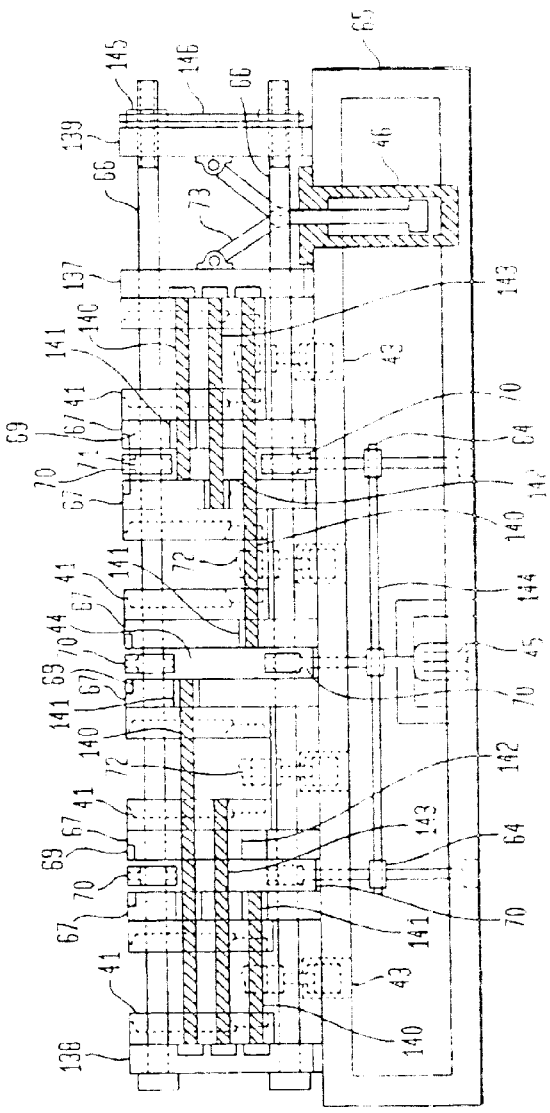
FIG. 41 is the side view of a stack blow mold assembly in an open position.

FIG. 41 shows a side view of a stack-blow mold cavity assembly 41 in an open position, as described in detail in FIG. 40 with front and rear blow mold clamp platens 137 and 138 as well as intermediary blow mold clamp platens 67 inter connected with tie bars 66 to a blow mold clamp back platen 139, synchronously driven by moving means 46 and 73 in conjunction with pivoting spacing platens 44 and right turn as well as left turn helical spindles 140 and 143 with helical nuts 141 and 142 and mold height adjustment nuts 145 and toothed belt 146;

FIG. 42 is a sequential side view from right to left of a molded preform 89 with a neck section 108 at an elevated temperature to receive an internal component before the shrinkage phase has been completed. An internal component pick-up and inserting device 109 having positioned an internal component 103 in the neck section 108 of a molded preform 89 while still at an elevated temperature. An internal component 103 is shrunk into the neck section 108 of a stretch blown hollow article 86 during the conditioning, the stretch blow and the cooling phase.

Figure 42A:
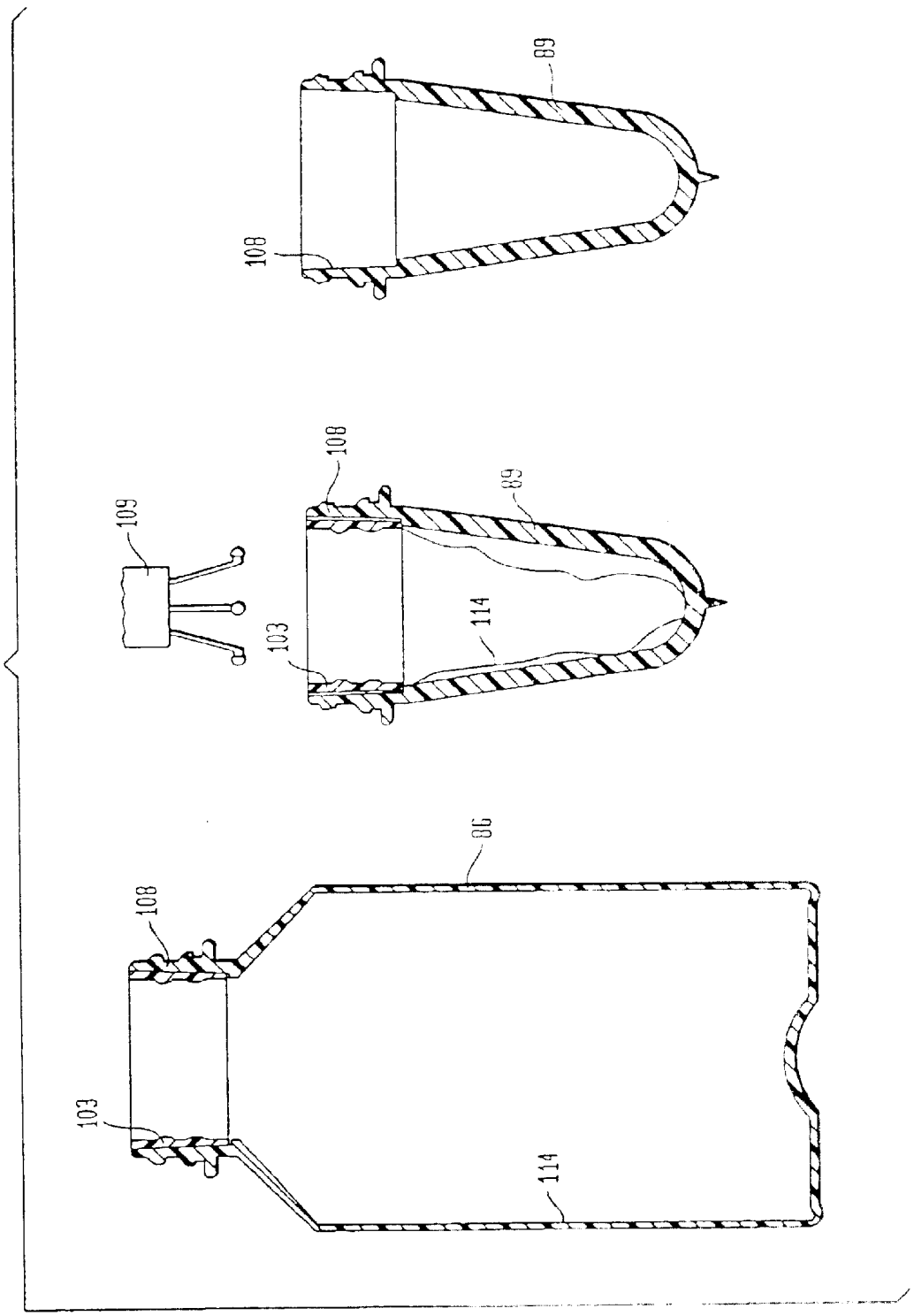
FIG. 42a is a sequential view from right to left of a molded preform as shown in FIG. 42 wherein an inner liner has been inserted into the preform and a multi-layer hollow article has been formed.

FIG. 42a is the same sequential view shown in FIG. 42 with the exception that an internal component 103 with inner liner 114 has been placed in a molded preform 89 while still at an elevated temperature. The molded preform 89 is being stretch blown into a multi-layer hollow article 86 with an internal component 103 and inner liner 114 in intimate contact with the neck 108 and body portion of the hollow article 86.

Figure 43:
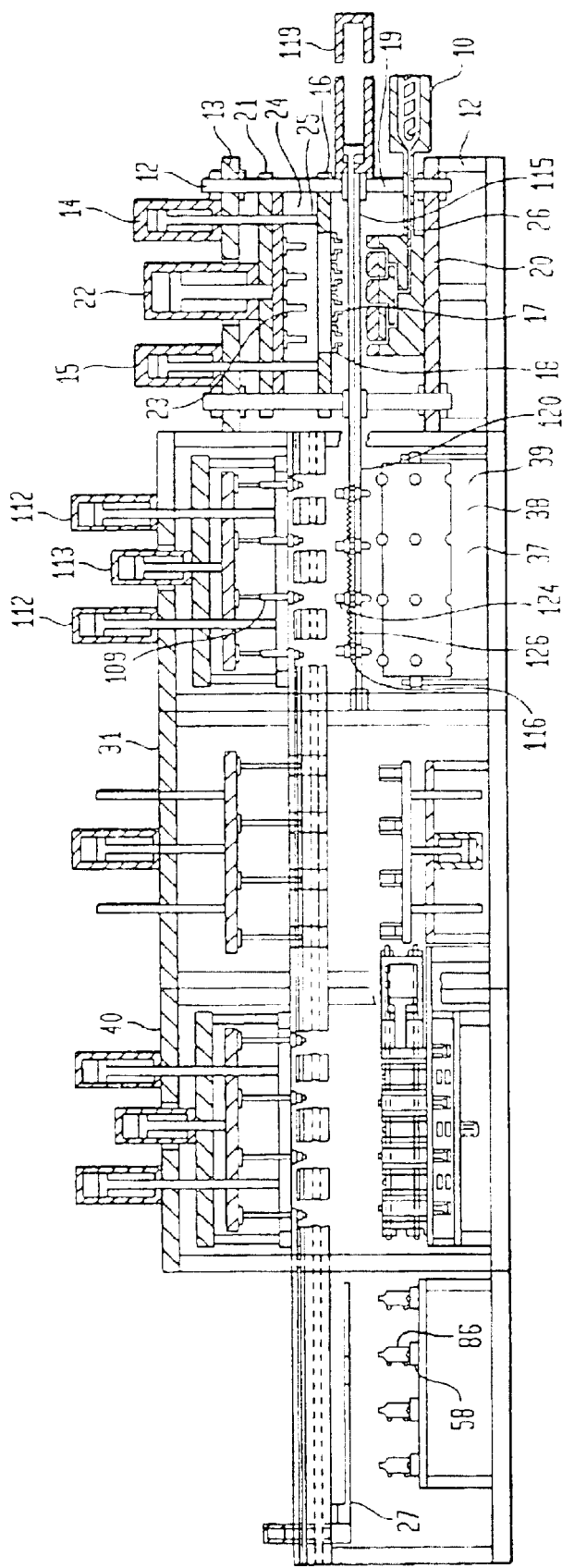
FIG. 43 is a side view of a multi-row stretch blow molding apparatus as described in principal in FIG. 27 showing from right to left a plasticizer, a preform molding unit with a tray unit holding molten preforms with their transfer beads on telescoped tray plates, an internal component indexing sorting and conveying unit and an internal component pick-up and inserting unit, a conditioning unit, a stretch blow unit, an oriented discharge unit, and a robot with a universal gripper assembly.

FIG. 43 is a side view of a multi-row stretch blow molding apparatus as described in detail in connection with FIG. 27 showing from right to left a plasticizer 10, a preform molding unit 12 with a tray unit 115 holding molten preforms with transfer beads 124 on their telescoped tray plates 116, with an internal component sorting unit 102 and an indexing sorting conveyor 104 which brings internal components 103 beneath a multitude of internal component pick-up and inserting devices 109. The component pick-up and inserting devices 109 are lowered towards the internal components 103 or internal components with inner liners 114 (not shown) in position on the indexing sorting conveyor 104 by moving means 112 and pick up the internal components 103 through monitoring motions of the central moving means 113. Internal components 103 are held in a waiting position (not shown) until the tray unit 115 transfers the molded preforms with internal component preparation 108 (not shown) at elevated temperature in position and then places the internal components 103 (not shown) or internal components with inner liners (not shown) into the molded preforms (not shown) prior to the completion of the shrinkage phase of the molded preforms.

The reinforced molded preforms (not shown) are then transferred by the universal gripper assembly 27 to a conditioning unit 31, lowered into a stretch blow molding unit 40 and transformed into hollow articles 86 with reinforcing internal components 103 (not shown) or internal components with liners 114 (not shown) are stretch blown into multi-layer hollow articles (not shown) which are retracted onto an oriented discharge unit 58.

FIG. 44 shows a side view of a multi-row stretch blow molding apparatus as shown in principal in FIG. 28 and described as well in FIG. 43 except the tray unit 115 is holding on their telescoped tray plates 116 with catch baskets 123 molten preforms without transfer beads 122;

FIG. 45 is a top view of a multi-row stretch blow-molding apparatus as described in detail in connection with FIG. 35 showing from right to left the plasticizers 10 and 11, respectively, the preform molding unit 12, with a tray unit 115, a sorting unit 102 to line up internal components 103 or internal components with inner liners 114 (not shown) onto an indexing sorting conveyor 104, a conditioning unit 31, a stretch blow unit 40, a primary gantry robot 84, with a universal gripper assembly 27 mounted on a lateral guide rail 85, as well as a secondary stretch blow molding unit 105, an oriented discharge unit 58 beneath a secondary gantry robot 111 with a universal secondary gripper assembly 106 mounted onto a secondary traversing beam 107.

FIG. 46 shows a schematic side view sequence basically described in connection with FIG. 36 of a robot 28 with a universal gripper assembly 27 from right to left starting at a molded preform pick up position 77, indexing to an internal component inserting position 110, traversing to a preform conditioning position 78, descending onto a preform stretch blow molding position 79, leaving the pretreated molded preforms in a blow-mold assembly 41 (not shown), returning to a gripper-waiting position 81, and ascending back towards a preform pick-up position 77 at a tray unit plate 116.

Simultaneously, a secondary robot 111 with a universal gripper assembly 106 picks up the pretreated molded preforms 89 (not shown) from the position 79 and transfers the same into a secondary or a multitude of subsequent stretch blow molding positions 97 prior to releasing the finished hollow articles in an oriented discharge position 80.

It will be understood by those skilled in the art that each of the elements described above, or two or more together, may also be used in alternate methods of producing molded articles therein and in other methods and apparatuses for the preparation of molded articles.

While the invention has been described in detail in the foregoing specification and drawings as embodied in the context of a single-row and a multi-row stretch blow molding method and apparatus for the preparation of molded articles, it will be appreciated that the description is not intended to be limited to the details shown and various modifications and structural changes may be made without departing from the spirit and scope of the invention.

What is claimed is:

1. Method for the preparation of hollow thermoplastic articles in a stretch blow-molding apparatus including a plasticizing unit and a preform-molding unit comprising a preform mold having a neck-ring clamp and an injection-core clamp, a tray unit with at least one row of telescoping tray plates and a robot having a universal gripper assembly conditioning unit, a stretch blow-molding unit having a blow-core clamp, a stretch-rod clamp, and a stack blow-mold clamp with at least one row of blow-mold cavities, and a discharge unit, comprising the steps of (a) plasticizing raw material in the plasticizing unit to form a molten material, (b) transferring the molten material from the plasticizing unit into the closed preform mold of the preform-molding unit, (c) molding preforms in the preform-molding unit, (d) opening the neck-ring clamp of the preform-molding unit (e) introducing the tray unit in-between the molded preforms during the preform-mold-clamp opening stroke, (f) collecting the ejected molten preforms by their transfer rings in the openings of at least one row of tray plates of the tray unit while retracting the injection-core clamp, and spreading the neck-ring assembly, (g) transferring the preforms with the tray unit out of the preform molding area, (h) closing the preform mold clamp assembly to start a new preform molding cycle, (i) lifting the transferred molten preforms with the universal gripper assembly of the robot out of the tray unit in an upright position and bring the preforms to the conditioning unit, (j) conditioning the preforms in the conditioning unit at a freely programmable time interval, (k) transferring the preforms with the universal gripper assembly of the robot in an upright position to the stretch blow molding unit, (l) stretchblow-molding the preforms in the blow molding unit in at least one row of blow-mold cavities into hollow articles at a freely programmable time interval, (m) transferring the hollow articles with the universal gripper assembly of the robot in an upright position to the discharge unit, (n) releasing the finished hollow articles from the universal gripper assembly of the robot onto the discharge unit, and (o) returning the universal gripper assembly of the robot to a waiting position at the preform-molding unit and the tray unit prior to completion of the preform-molding cycle.

2. Method for the preparation of hollow thermoplastic articles in a stretch blow-molding apparatus including a plasticizing unit and a preform-molding unit comprising a preform mold having a neck-ring clamp and an injection-core clamp, a tray unit with at least one row of tray plates with catch baskets mounted beneath and a robot having a universal gripper assembly, a conditioning unit, a stretch blow-molding unit having a blow-core clamp, a stretch-rod clamp, and a stack blow-mold clamp with at least one row of blow-mold cavities, and a discharge unit, comprising the steps of (a) plasticizing raw material in the plasticizing unit to form a molten material, (b) transferring the molten material from the plasticizing unit into the closed preform mold of the preform-molding unit, (c) molding preforms in the preform-molding unit, (d) opening the neck-ring clamp of the preform-molding unit, (e) introducing the tray unit in between the molded preforms during the preform-mold-clamp opening stroke, (f) collecting the ejected molten preforms without transfer beads by their bottom areas in at least one row of baskets mounted beneath the tray plate openings of the tray unit while retracting the injection-core clamp, and spreading the neck-ring assembly, (g) transferring the preforms with the tray unit out of the preform molding area, (h) closing the preform mold clamp assembly to start a new preform molding cycle, (i) lifting the transferred molten preforms with the universal gripper assembly of the robot out of the tray unit and bring the preforms in an upright position to the conditioning unit, (j) conditioning the preforms in the conditioning unit at a freely programmable time interval, (k) transferring the preforms with the universal gripper assembly of the robot to the blow molding unit, (l) stretch blow-molding the preforms in the blow molding unit in at least one row of blow-mold cavities into hollow article at a freely programmable time interval, (m) transferring the hollow articles with the universal gripper assembly of the robot to the discharge unit, (n) releasing the finished hollow articles from the universal gripper assembly of the robot onto the discharge unit, and (o) returning the universal gripper assembly of the robot to a waiting position at the preform-molding unit and the tray unit prior to completion of the preform-molding cycle.

3. Method for the preparation of hollow thermoplastic articles in a stretch blow-molding apparatus including a plasticizing unit and a preform-molding unit comprising a preform mold having a neck-ring clamp and an injection-core clamp, a take-out tray unit with at least one row of tray plates and a robot having a universal gripper assembly, a conditioning unit, a stretch blow-molding unit having a blow-core clamp, a stretch-rod clamp, and a stack blow-mold clamp with at least one row of blow-mold cavities, and a discharge unit, comprising the steps of (a) plasticizing raw material in the plasticizing unit to form a molten material, (b) transferring the molten material from the plasticizing unit into the closed preform mold of the preform-molding unit, (c) molding preforms in the preform-molding unit, (d) opening the neck-ring clamp of the preform-molding unit, (e) introducing the tray unit in between the molded preforms during the preform-mold-clamp opening stroke, (f) collecting the ejected molten preforms in the openings of at least one row of tray plates in the tray unit while retracting the injection-core clamp, and spreading the neck-ring assembly, (g) transferring the preforms with the tray unit out of the preform molding area, (h) closing the preform mold clamp assembly to start a new preform molding cycle, (i) lifting up the transferred molded preforms with the universal gripper assembly of the robot and bringing the preforms in an upright position to the conditioning unit, (j) conditioning the preforms in the conditioning unit at a freely programmable time interval, (k) transferring the preforms with the universal gripper assembly of the robot in an upright position to the blow molding unit, (l) stretch blow-molding the preforms in the blow molding unit in at least one row of blow-mold cavities into hollow article at a freely programmable time interval, (m) transferring the hollow articles with the universal gripper assembly of the robot in an upright position to the discharge unit, (n) releasing the finished hollow articles from the universal gripper assembly of the robot in an upright position into the discharge unit, (o) returning the universal gripper assembly of the robot to a waiting position at the preform-molding unit and the tray unit prior to completion of the preform-molding cycle, and (p) laterally moving the upper blow-mold clamp assembly on linear bearings to facilitate mold and tooling change over.

4. Method in accordance with claim 3, further comprising the steps of (a) transferring the molten preforms with the tray unit out of the preform molding area into the conditioning unit, (b) closing the preform mold assembly to start a new preform molding cycle, (c) lifting the conditioned preforms with the universal gripper assembly of the robot out of at least one tray plate of the tray unit in an upright position and transferring the conditioned preforms into the stretch blow molding unit, (d) stretch blow molding the conditioned preforms in the blow mold unit in at least one row of blow mold cavities into hollow articles at a freely programmable time interval, (e) lifting the hollow articles from the stretch blow molding unit with the universal gripper assembly of the robot and transfer the hollow articles to an oriented discharge unit, and (f) returning the universal gripper assembly with the robot to a waiting position at the preform molding and tray unit prior to completion of the preform molding cycle.

5. Method in accordance with claim 3, further comprising the steps of (a) transferring the molten preforms with the tray unit out of the preform molding area into a conditioning unit, (b) closing the preform mold clamp assembly to start a new preform mold cycle, (c) lifting a fraction of conditioned preforms with the universal gripper assembly of a primary robot out of at least one tray plate of the tray unit in an upright position, (d) transferring the conditioned preforms to the stretch blow molding unit and returning to the tray unit ready to pick up the next fraction of conditioned preforms, (e) stretch blow molding the fraction of conditioned preforms in the blow molding unit in at least one row of blow mold cavities into hollow articles at a freely programmable time interval, (f) picking up the fraction of hollow articles from the stretch blow molding unit with the universal gripper assembly of a secondary robot, and (g) transferring the hollow articles to an oriented discharge unit.

6. Method in accordance with claim 3, further comprising the steps of (a) transferring molten preforms with the tray unit out of the preform molding area into the conditioning unit, (b) closing the preform mold assembly to start a new preform molding cycle, (c) lifting at least one fraction of conditioned preforms with at least one robot with universal gripper assemblies out of the common tray unit, (d) transferring at least one fraction of conditioned preforms into at least one stretch blow molding units, (e) stretch blow molding the at least one fraction of conditioned preforms in at least one blow molding units in at least one row each of blow mold cavities into hollow articles at a freely programmable time interval, (f) lifting the at least one fraction of hollow articles out at least one stretch blow molding units with at least one robot with universal gripper assemblies, (g) releasing at least one fraction of hollow articles onto at least one oriented discharge units, (h) returning at least one robot with universal gripper assemblies to the common tray unit to pick up at least one other fraction of conditioned preforms, (i) transferring at least one other fraction of conditioned preforms through the same processing units as at least one fraction of conditioned preforms, and (j) returning to a waiting position at the preform molding and tray unit prior to completion of the preform molding cycle.

7. Method in accordance with claim 3, further comprising the step of spacing all processing units individually to allow turning and adding units as the molding process requires.

8. Method in accordance with claim 3, further comprising the steps of spacing the center rows of the tray plates in the tray unit from the center row spacings of the preform mold during molten preform collection into the center row spacings of the downstream units when transferring the molten preforms into the discharge position.

9. Method in accordance with claim 3, further comprising the steps of spacing the center distances of the gripper components of the universal gripper assembly in the robot from the center distances of the preform mold to the center distances of the blow mold cavities during the robot transfer phase.

10. Method for stretch blow molding finished hollow articles in accordance with claim 3, further comprising picking up preheated preforms from a lateral reheating unit with a pivoting robot having a universal gripper assembly.

11. Method for stretch blow molding finished hollow articles with external components in accordance with claim 3, comprising the steps of a) lowering molten preforms by a robot with a universal gripper assembly into a closing blow mold and stretch blowing the molten material against components placed into the blow mold halves during a previous molding cycle, (b) picking up and holding components with a following component transfer device adjacent to the blow mold unit during the blow molding phase, (c) returning a robot with the universal gripper to a waiting position at a preform molding and tray unit after releasing finished hollow articles onto an oriented discharge unit (d) placing the external components with the following component transfer devices into the now open and empty blow mold halves during the waiting phase of the universal gripper assembly.

12. Method for stretch blow molding of finished hollow articles with internal components in accordance with claim 3, comprising the steps of:

(a) picking up and guiding molded preforms at elevated temperatures to an internal component inserting unit with a robot and a universal gripper assembly, (b) placing internal components with inserting devices inside the molten preforms prior to the completion of their shrinkage phase, and (c) guiding the molten preforms with inserted internal components to conditioning and stretch blow and discharge units for the manufacture and release of the now neck reinforced hollow articles.

13. Method for stretch blow molding finished hollow articles with a multitude of stretch blow mold units in accordance with claim 3, comprising the steps of:

(a) placing molded and conditioned preforms into a first blow molding unit by a robot with a universal gripper assembly and returning the robot to a waiting position at the preform and tray unit for a new cycle to begin, (b) lifting the pretreated preforms out of said first blow-molding unit with a secondary robot having a universal gripper assembly and guiding them into subsequent blow-molding units for further treatment, (c) lifting the pretreated hollow articles out of a second blow-molding unit with a secondary robot having a universal gripper assembly and guiding them into subsequent blow-molding units for further treatment, and (d) lifting the finished hollow articles out of a final blow-molding unit by means of said secondary robot having a universal gripper assembly and releasing them into an oriented discharge unit.

14. Method for stretch blow blow molding finished hollow articles with a multitude of blow mold rows combined in a modular stack mold including the steps of (a) opening, closing, holding and aligning the blow mold halves at selected center-row distances with a multitude of pivoting spacing platens driven by pivoting means in conjunction with a multitude of helical spindles with nuts connected to diverging and converging blow mold clamp platens driven by synchronizing clamping means, (b) applying the necessary clamping force toward one another during mold closing and releasing force during mold opening by a synchronized clamp platen assembly located at each end of the modular stack blow molds, pivoting spacing platens and turning helical spindles in helical nuts driven by pivoting means and synchronized converging and diverging clamping means (c) adjusting the mold heights via tooth belted tie bar nuts and driving means connected to the stack blow mold assembly back platen and tie bars, (d) adding pivoting spacing platens, helical spindle assemblies and blow mold platens to increase the number of blow mold row assemblies, and (e) removing pivoting spacing platens, helical spindle assemblies and blow mold platens to decrease the number of blow mold row assemblies.

15. Method for stretch blow molding finished hollow articles by transferring molten preforms from a molding machine in multi-stages through all the processing phases in an open circuit with a robot having a universal gripper assembly in accordance with claim 3, comprising the steps of (a) lifting molten preforms out of the tray unit in an upright position by a robot with a universal gripper assembly in gripping the preforms at the neck area, (b) traversing molten preforms through the processing phases of conditioning and stretch blow-molding by a robot with a universal gripper assembly, each at freely programmable time intervals, (c) releasing the finished hollow articles and returning the robot with the universal gripper assembly to a waiting position at the preform molding and tray unit, (d) traversing each processing unit with a robot having a universal gripper assembly at variable time intervals, (e) traversing each processing unit at variable distance strokes by a robot having a universal gripper assembly, and (f) describing a freely programmable movement from a horizontal to a vertical plane with a robot having a universal gripper assembly, enabling the grasping of molten preforms with different neck portion diameters and a multitude of mold-cavity center row distances.

16. Method for stretch blow molding finished hollow articles by transferring molten preforms from a molding machine in multi-stages through all the processing phases with a robot having a universal gripper assembly in accordance with claim 3 comprising the steps of (a) lifting a fraction of the molten preforms out of the tray unit with a robot having a universal gripper assembly in gripping the preforms at the neck area, (b) traversing the fraction of molten preforms through the processing phases of conditioning and stretch blow-molding with a robot having a universal gripper assembly, each at freely programmable time intervals, (c) releasing the fraction of finished hollow articles and returning the robot with the universal gripper assembly to the tray unit to lift out a consecutive fraction of preforms in gripping the preforms at the neck area, (d) traversing the consecutive fraction of molten preforms through the processing phases of conditioning and stretch blow molding with a robot having a universal gripper assembly, each at freely programmable time intervals, (e) releasing each fraction of finished hollow articles and returning the robot with the universal gripper assembly to a waiting position at the preform molding and the tray unit (f) traversing each processing unit with a robot having a universal gripper assembly at variable time intervals, (g) traversing each processing units at variable distance strokes with a robot having a universal gripper assembly, (h) describing a freely programmable movement from a horizontal to a vertical plane with a robot having a universal gripper assembly, enabling the grasping of molten preforms with different neck portion diameters and a multitude of mold-cavity center distances, and (i) transferring the molten preforms through the processing units in an upright position.

17. Apparatus for producing finished hollow articles in a single and multi-row stack blow mold clamp assembly including (a) a plasticizing unit for plasticizing raw material, (b) a preform molding unit having a frame-type clamp platen to mount neck-split holding bars adapted with neck splits at freely adjustable center row distances in accordance with the equivalent preform-mold-center distances, the molding unit sliding on tie-bars between a fixed upper platen and a base machine platen, (c) a clamp platen housing mounted on the frame-type clamp platen which holds the clamp platen for the different rows of injection cores according to the center-distance rows of the neck split bars and neck splits, (d) a tray unit with a multitude of tray plate rows at freely adjustable center-row distances according to the equivalent center-row distances of the preform mold and the down stream processing units, (e) a conditioning unit with a clamp platen and holding bars for mounting conditioning rods at freely adjustable center-row distances and heat-pots at center-row distances according to the equivalent center-row distances of the downstream processing units, (f) a stretch blow unit having a frame-type clamp platen to mount blow core holding bars with blow cores at freely adjustable center-row distances sliding on tie-bars between a fixed upper platen and a base machine frame, (g) a frame-type housing mounted onto the frame-type clamp platen holding the clamp platen for the different rows of stretch rods according to the center-distance rows of the blow-core bars and blow cores, (h) a stretch blow unit having a stretch rod and blow core assembly movable laterally on linear bearings to facilitate mold and tooling mounting, (i) a modular stack blow mold clamp assembly having a plurality of pivoting spacing platens and a plurality of lateral helical spindles with nuts to open, close, hold, accelerate and align a multitude of blow mold halves with the corresponding blow core, stretch rod, and bottom plug rows, (j) a stack-blow-mold clamp assembly movable synchronously with a plurality of pivoting spacing platens with pivoting means and a plurality of lateral helical spindles with nuts and a multitude of stack-blow-mold halves which maintain the corresponding center row distances of the external means entering the blow-mold cavities during operation, (k) a multitude of pivoting spacing platens variable in size according to the desired stack-blow-mold cavity opening strokes (l) a multitude of pivoting spacing platens variable in number according to the desired number of blow-mold cavity rows, (m) a multitude of lateral helical spindles with nuts according to the desired number of blow-mold cavity rows, (n) a multitude of tie bar nuts connected to tie bars and the blow mold assembly back platen is turned by driving means and a toothed belt for mold height adjustment, (o) an oriented discharge unit to release finished hollow articles, (p) a take out tray unit with retracted tray plates to collect molten preforms during the opening stroke of the preform mold unit at the preform mold center row distances to guide the molten preforms out of the preform mold unit and to extend the tray plate center row distances during transfer of the molten preforms to align with the center row distances of the down stream processing units, (q) a robot having a universal gripper assembly and opening and closing means to pick up molten preforms from the extended tray unit and to guide the preforms through a multitude of processing units which transform the preforms into finished hollow articles, (r) a robot with a universal gripper assembly and gripper components telescopically retractable and extendable to vary the center distances of the gripper component preform holding cut outs according to the center distances of the preform mold and the blow mold cavity center distances, (s) a robot with a universal gripper assembly to pick up pretreated hollow articles and guide them into secondary blow mold units for transformation into finished hollow articles prior to release onto an oriented discharge unit, (t) a component transfer device assembly to pick up external components from dispensing cartridges and release them into open blow mold cavities simultaneously during other processing phases, (u) a component inserting unit to place internal components inside molten preforms prior to completion of their shrinkage phase, and a component-inserting unit to place internal liners inside molten preforms to form a multi-layer hollow article, and (v) all processing units being independently turnable in relation to each other to minimize the number of universal gripper assemblies and to speed up the mold change-over procedure.

* * * * *